US012097635B2

(12) United States Patent
Shimizu et al.

(10) Patent No.: US 12,097,635 B2
(45) Date of Patent: Sep. 24, 2024

(54) STAPLE REFILL

(71) Applicant: MAX CO., LTD., Tokyo (JP)

(72) Inventors: Toshio Shimizu, Tokyo (JP); Futoshi Kameda, Tokyo (JP); Katsunori Manabe, Tokyo (JP); Kiichi Haramiishi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 104 days.

(21) Appl. No.: 17/035,308

(22) Filed: Sep. 28, 2020

(65) Prior Publication Data

US 2021/0008754 A1 Jan. 14, 2021

Related U.S. Application Data

(63) Continuation of application No. 16/185,357, filed on Nov. 9, 2018, now Pat. No. 10,821,626.

(30) Foreign Application Priority Data

Nov. 10, 2017 (JP) ................................ 2017-217197
Nov. 2, 2018 (JP) ................................ 2018-207724

(51) Int. Cl.
*B25C 5/16* (2006.01)
*B27F 7/38* (2006.01)
*B65H 37/04* (2006.01)

(52) U.S. Cl.
CPC ............... *B27F 7/38* (2013.01); *B65H 37/04* (2013.01)

(58) Field of Classification Search
CPC ....... B25C 5/16; B25C 5/1637; B25C 5/1648; B25C 5/1696; B27F 7/38
See application file for complete search history.

(56) References Cited

U.S. PATENT DOCUMENTS 4,569,469 A * 2/1986 Mongeon ........... A61B 17/0682 206/338
5,273,199 A * 12/1993 Logtens .................. B25C 5/085 227/87

(Continued)

FOREIGN PATENT DOCUMENTS

CN 1662351 A 8/2005
CN 1845813 A 10/2006

(Continued)

OTHER PUBLICATIONS

Office Action application CN 201811330902.6 dated Aug. 19, 2020, 5 pages.

(Continued)

*Primary Examiner* — Gloria R Weeks
(74) *Attorney, Agent, or Firm* — Banner & Witcoff, Ltd.

(57) ABSTRACT

A refill includes a peripheral wall defining a space capable of accommodating staples therein. The peripheral wall includes a bottom wall having a first side, a second side opposite to the first side, and a third side connecting end portions of the first side and the second side, a first side wall standing from the first side, a second side wall standing from the second side and opposing the first side wall, and a front wall positioned above the third side and connecting the first side wall and the second side wall. A first opening is formed on the first side wall and the front wall to extend across a boundary between the first side wall and the front wall.

5 Claims, 28 Drawing Sheets

(56) References Cited

U.S. PATENT DOCUMENTS

| | | | | | |
|---|---|---|---|---|---|
| 5,474,222 | A * | 12/1995 | Kanai | B25C 5/1624 227/155 |
| 5,560,529 | A * | 10/1996 | Udagawa | B27F 7/38 227/120 |
| 5,575,054 | A * | 11/1996 | Klinzing | A61B 17/1222 227/176.1 |
| 6,474,633 | B1 * | 11/2002 | Hirai | B25C 5/1658 227/119 |
| 6,672,499 | B1 * | 1/2004 | Lee | B25C 5/161 227/120 |
| 6,899,258 | B2 * | 5/2005 | Haramiishi | B27F 7/38 227/120 |
| 9,242,392 | B2 * | 1/2016 | Shimizu | B27F 7/38 |
| 9,435,072 | B1 * | 9/2016 | Harrison | D06F 95/008 |
| 9,573,260 | B2 * | 2/2017 | Walters, Jr. | B25C 5/1658 |
| 9,586,334 | B2 * | 3/2017 | Sugihara | B27F 7/38 |
| 9,604,386 | B2 * | 3/2017 | Sugihara | B27F 7/38 |
| 9,687,996 | B2 * | 6/2017 | Sugihara | B27F 7/38 |
| 10,500,705 | B2 * | 12/2019 | French | B25C 5/1634 |
| 10,870,215 | B2 * | 12/2020 | Shimizu | B25C 5/1689 |
| 11,077,580 | B2 * | 8/2021 | Shimizu | B27F 7/38 |
| 2002/0030078 | A1 * | 3/2002 | Mochizuki | B27F 7/38 227/120 |
| 2005/0284911 | A1 * | 12/2005 | Yagi | B27F 7/19 227/155 |
| 2006/0054654 | A1 * | 3/2006 | Haramiishi | B27F 7/38 227/136 |
| 2006/0144890 | A1 * | 7/2006 | Haramiishi | B27F 7/38 227/120 |
| 2006/0261123 | A1 | 11/2006 | Kishi et al. | |
| 2008/0075559 | A1 | 3/2008 | Baba et al. | |
| 2010/0193563 | A1 | 8/2010 | Haramiishi et al. | |
| 2011/0089215 | A1 | 4/2011 | Shimizu et al. | |
| 2011/0290849 | A1 | 12/2011 | Haramiishi et al. | |
| 2012/0298538 | A1 | 11/2012 | Haramiishi et al. | |
| 2012/0298714 | A1 | 11/2012 | Haramiishi et al. | |
| 2012/0298715 | A1 | 11/2012 | Haramiishi et al. | |
| 2013/0087595 | A1 | 4/2013 | Haramiishi et al. | |
| 2013/0092577 | A1 | 4/2013 | Sugihara et al. | |
| 2013/0092578 | A1 | 4/2013 | Sugihara et al. | |
| 2013/0092580 | A1 * | 4/2013 | Sugihara | B25C 7/00 206/340 |
| 2013/0292447 | A1 | 11/2013 | Haramiishi et al. | |
| 2014/0367442 | A1 * | 12/2014 | Gadekar | B25C 5/11 206/340 |
| 2016/0185149 | A1 | 6/2016 | Kenjo | |
| 2017/0197328 | A1 | 7/2017 | Sugihara et al. | |
| 2017/0259453 | A1 | 9/2017 | Sugihara et al. | |

FOREIGN PATENT DOCUMENTS

| | | | |
|---|---|---|---|
| CN | 101001798 | A | 7/2007 |
| CN | 102049805 | A | 5/2011 |
| CN | 103042504 | A | 4/2013 |
| CN | 103042578 | A | 4/2013 |
| CN | 105730040 | A | 7/2016 |
| EP | 1 598 149 | A1 | 11/2005 |
| EP | 2 311 613 | A2 | 4/2011 |
| EP | 2902163 | B1 | 5/2016 |
| JP | H04-054683 | U | 5/1992 |
| JP | 4042156 | B2 | 2/2008 |
| JP | 4042159 | B2 | 2/2008 |
| JP | 2016-182829 | A | 10/2016 |

OTHER PUBLICATIONS

European Search Report issued in Application No. 18205094.8, dated Apr. 10, 2019, 6 pages.

* cited by examiner

STAPLE REFILL

CROSS-REFERENCE TO RELATED APPLICATION

This application is a continuation of U.S. patent application Ser. No. 16/185,357, filed on Nov. 9, 2018, which claims priorities from Japanese Patent Application No. 2017-217197 filed on Nov. 10, 2017 and Japanese Patent Application No. 2018-207724 filed on Nov. 2, 2018, the entire contents of which are incorporated herein by reference.

TECHNICAL FIELD

Aspects of the present invention relate to a refill for accommodating staples therein.

BACKGROUND ART

There have been widely used electric staplers which can automatically perform a stapling process. As electric staplers, there have been known, for example, staplers which are built in a post-processing device installed on a downstream stage of an image formation apparatus, such as a copy machine or a printer, or desktop-type staplers (standalone).

A general electric stapler includes a cartridge including a striking unit for striking staples and a stapler main body, on which the cartridge is to be mounted. A refill is replaceably mounted to (loaded to) the cartridge. The refill accommodates therein connected staples formed by connecting a plurality of generally linear staples side by side into a sheet shape while being stacked (e.g., see JP-B-4042156, JP-B-4042159 or JP-A-2016-182829).

In the electric stapler, as a binding process is started, connected staples accommodated in the refill are successively conveyed to the striking unit, and a staple on a leading end portion of the conveyed connected staple is shaped in a generally U-shape by a forming plate. Thereafter, the shaped staple is driven into sheets of paper by a driver plate, and then the staple penetrating the sheets of paper is clinched.

Here, in the above electric stapler, if a dimension or shape of the staples is out of specifications, or deformation such as warpage or bending occurs on the staples, a poor feeding or a poor binding is caused. Therefore, staples, which are out of specifications or deformed, have to be excluded at an inspection stage before the staples are accommodated in the refill. Herein, unless otherwise stated, the term “staple” includes “connected staple.”

However, even when the inspection of staples is preliminarily performed as described above, there is a case where staples which are out of specifications or deformed pass through the preliminary inspection although that is extremely rare. Further, although staples are normal at the inspection stage, the staples may be deformed for some reason when the staples are accommodated into the refill or after the staples are accommodated in the refill. However, in the conventional refills as described in JP-B-4042156, JP-B-4042159 or JP-A-2016-182829, it is difficult to find abnormalities, such as deformation of staples, once the staples are accommodated in the refill.

SUMMARY

Accordingly, an aspect of the present invention provides a refill, for which a dimension, shape, deformation and the like of staples can be checked even after the staples are accommodated therein.

According to an embodiment of the present invention, there is provided a refill including a peripheral wall defining a space capable of accommodating staples therein. The peripheral wall includes a bottom wall having a first side, a second side opposite to the first side, and a third side connecting end portions of the first side and the second side, a first side wall standing from the first side; a second side wall standing from the second side and opposing the first side wall; and a front wall positioned above the third side and connecting the first side wall and the second side wall. A first opening is formed on the first side wall and the front wall to extend across a boundary between the first side wall and the front wall.

According to the above configuration, the first opening is provided on the boundary between the first side wall and the front wall, so that a staple leg tip end of staples accommodated in the refill can be exposed through the first opening. Therefore, even after the staples are accommodated in the refill, a state of the staples can be checked through the first opening, or a dimension of the staples can be measured by bring a measuring instrument into contact with the staple leg tip end of the staples exposed through the first opening or the like.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
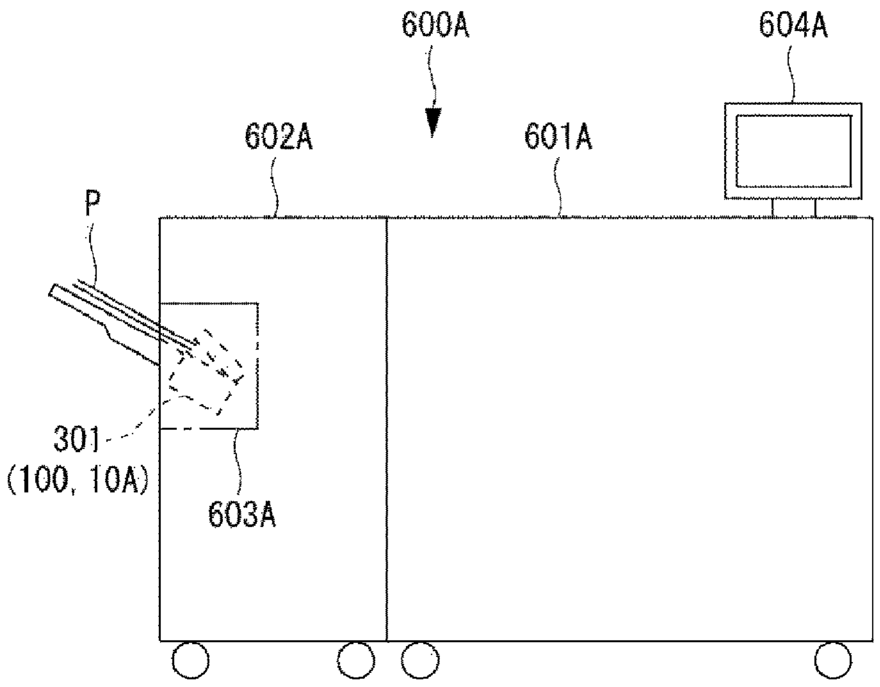
FIG. 1 is a schematic view of an image formation system according to an embodiment of the present invention.

Hereinafter, embodiments of the present disclosure will be described in detail with reference to the accompanying drawings. Meanwhile, dimension ratios in the drawings may be expanded for convenience of explanation and thus may differ from actual ratios. Further, in the present embodiment and the figures, for convenience of explanation, a supplying direction of connected staples to a refill (alternatively inserting direction or connecting direction of staples in one connected staple) is referred to as a front-rear direction of the refill. Accordingly, a side of the refill, on which a discharging port for connected staples is provided, is referred to as a front side and a side opposite thereto is referred to as a rear side. Further, a stacking direction of connected staples is referred to as an upper-lower direction of the refill, and a direction perpendicular to the front-rear direction and the upper-lower direction is referred to as a right-left direction of the refill.

[Exemplary Configuration of Image Formation System 600A]

FIG. 1 is a configuration diagram showing an image formation system 600A according to the present embodiment. The image formation system 600A of the present embodiment includes an image formation device 601A and a post-processing device 602A capable of performing at least one kind of processing. The image formation device 601A is configured to form an image on a sheet of paper P fed from a paper feeding unit (not shown), which is provided inside or outside the device, and then to output the sheet of paper P. In the present example, the image formation device 601A is configured to form an image on the sheet of paper P by forming an electrostatic latent image by scanning exposure, developing the electrostatic latent image with toner, and then transferring and fixing the toner onto the sheet of paper. The post-processing device 602A of the present embodiment includes the stapler 301 on a binding portion 603A thereof. On the stapler 301, a cartridge 100 to which a refill 10A is loaded is removably attached as described below.

[Exemplary Configuration of Refill 10A]

Figure 2:
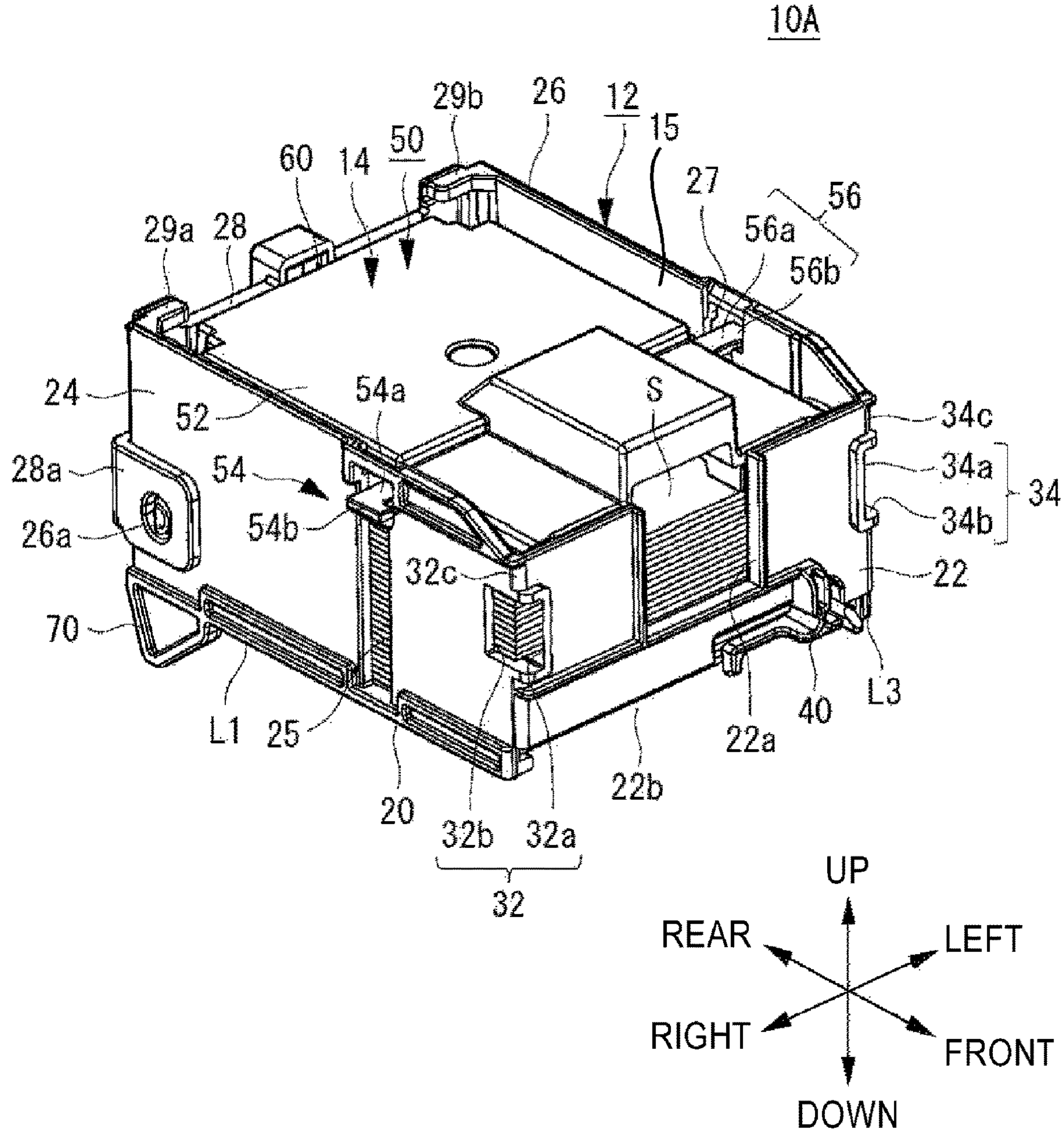
FIG. 2 is a perspective view of a refill according to an embodiment of the present invention, as viewed from the right front side thereof.
Figure 3:
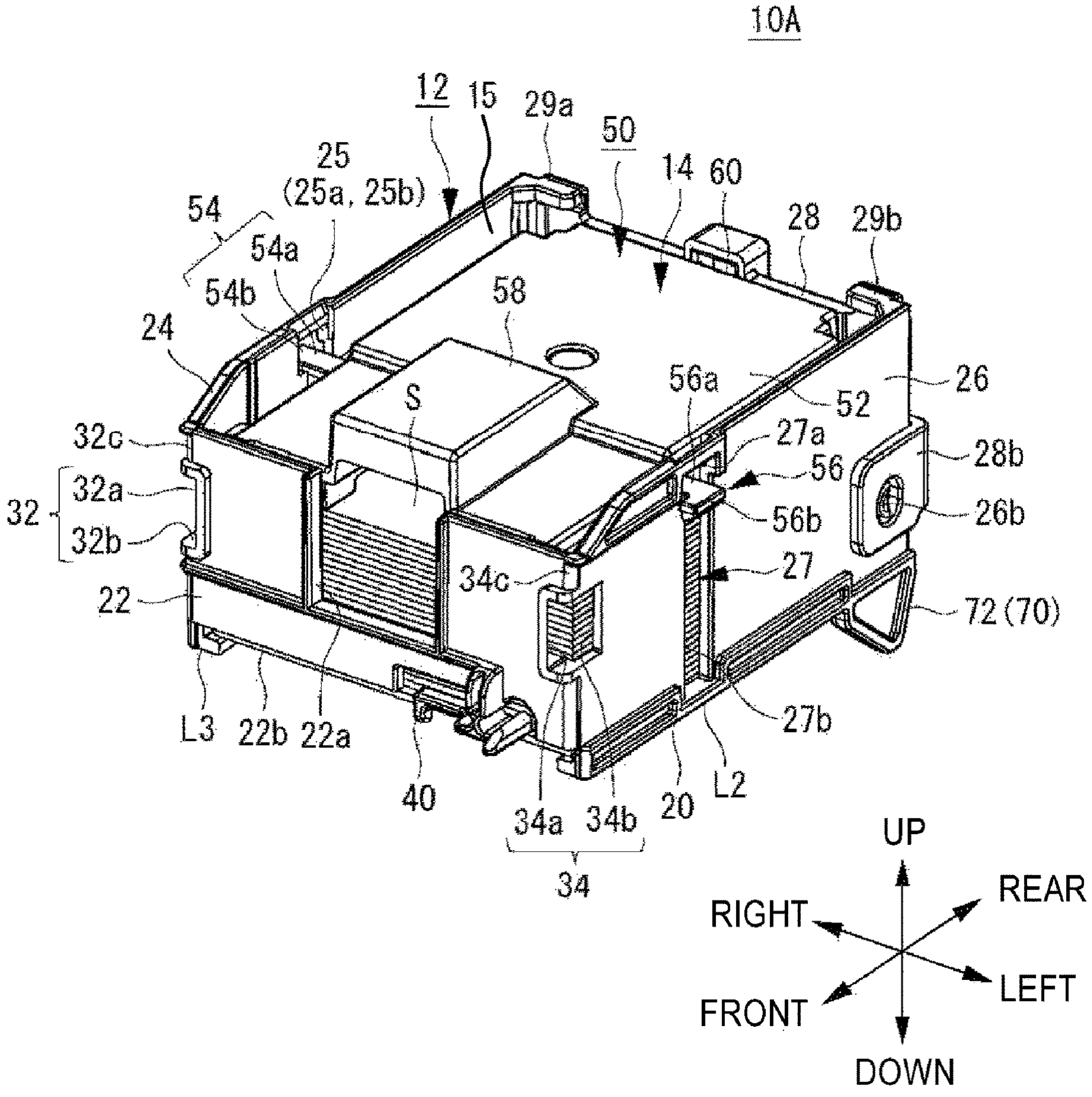
FIG. 3 is a perspective view of the refill according to an embodiment of the present invention, as viewed from the left front side thereof.
Figure 4A:
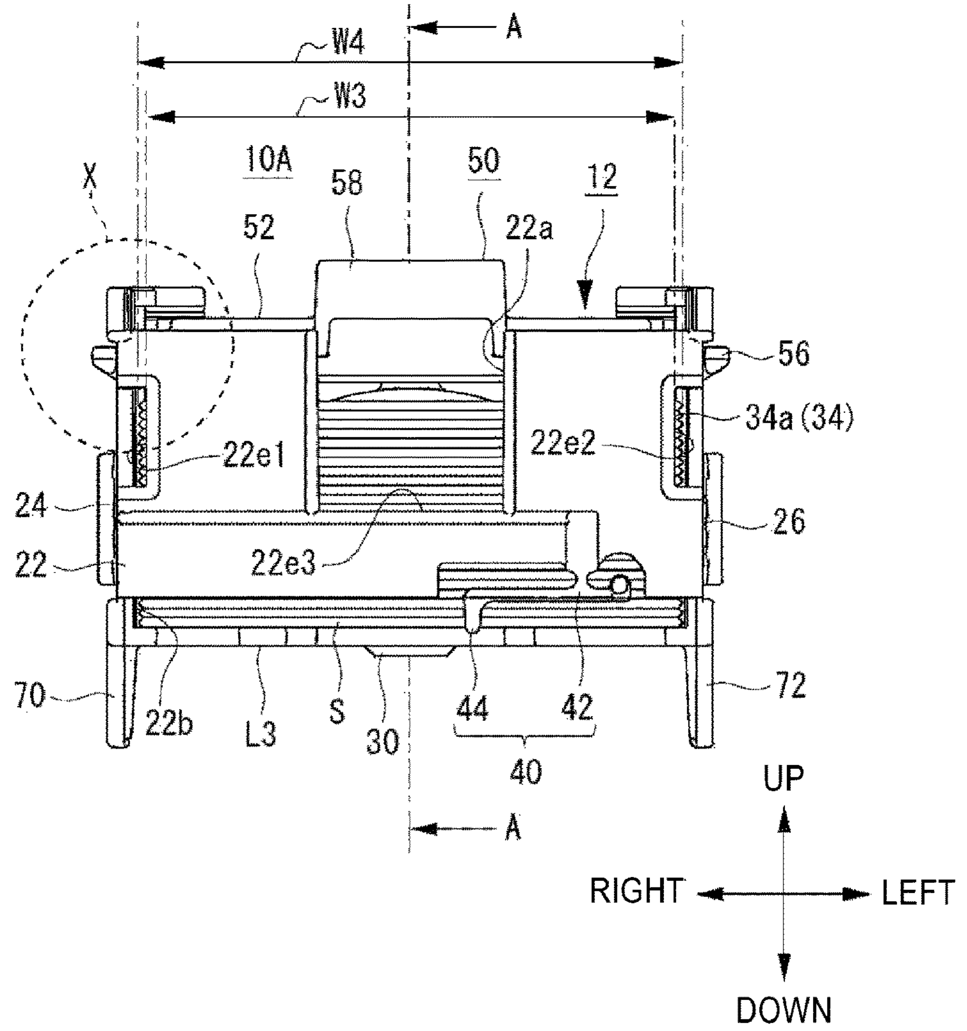
FIG. 4A is a front view of the refill.
Figure 4B:
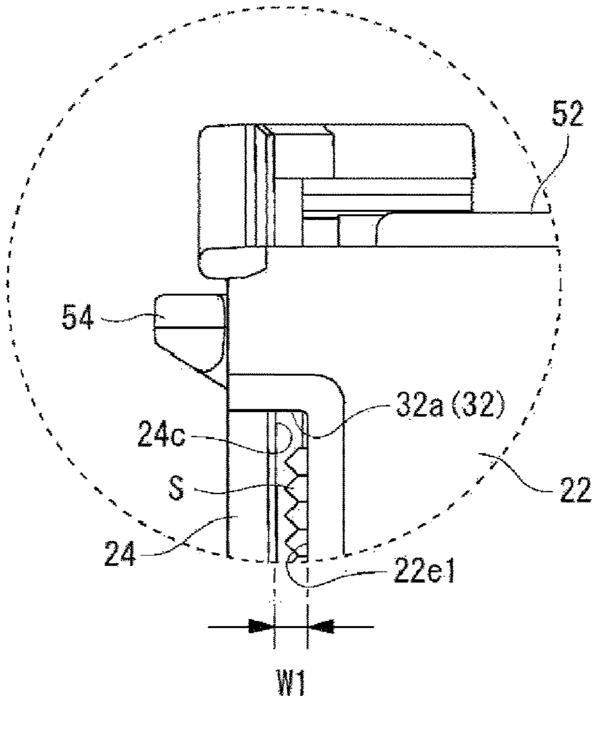
FIG. 4B is an enlarged view showing a part thereof.
Figure 5A:
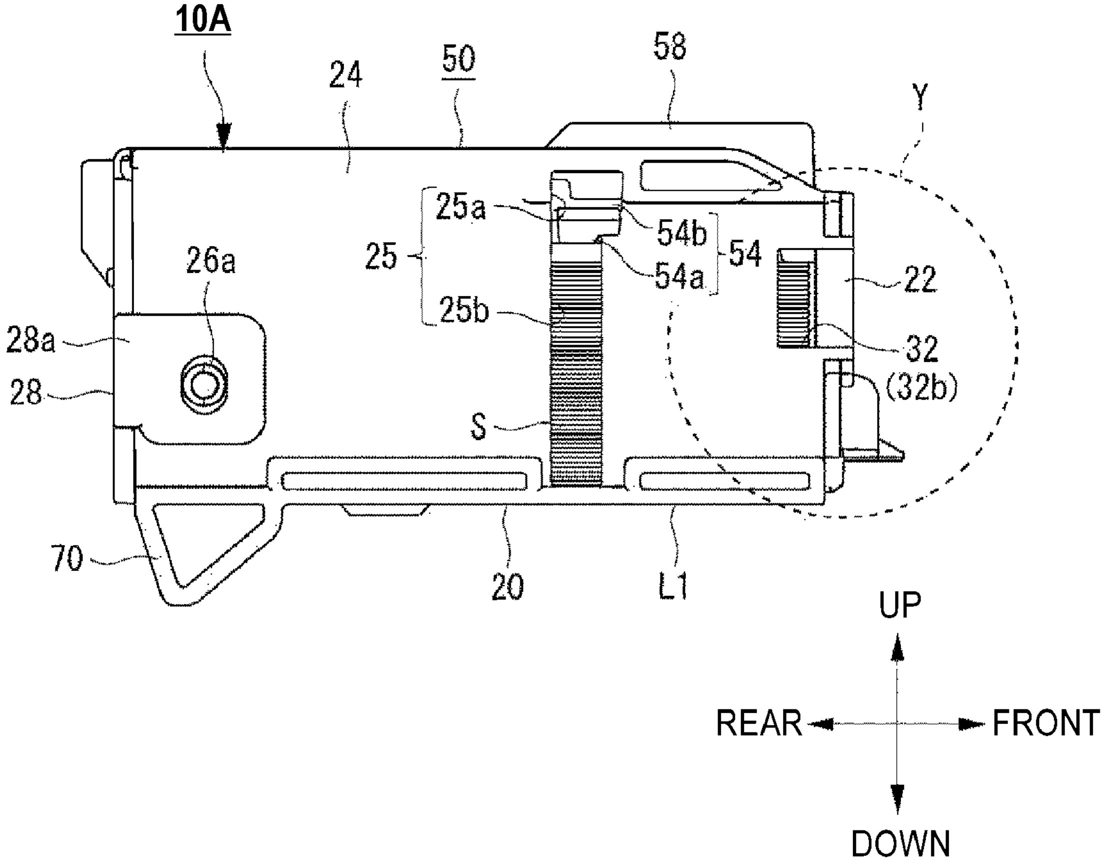
FIG. 5A is a side view of the refill.
Figure 5B:
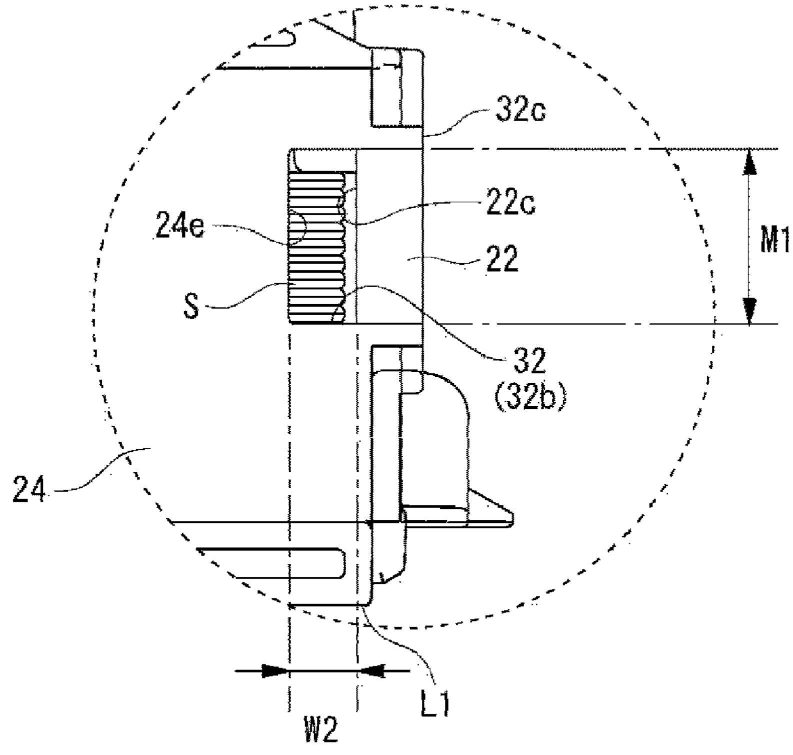
FIG. 5B is an enlarged view showing a part thereof.
Figure 6:
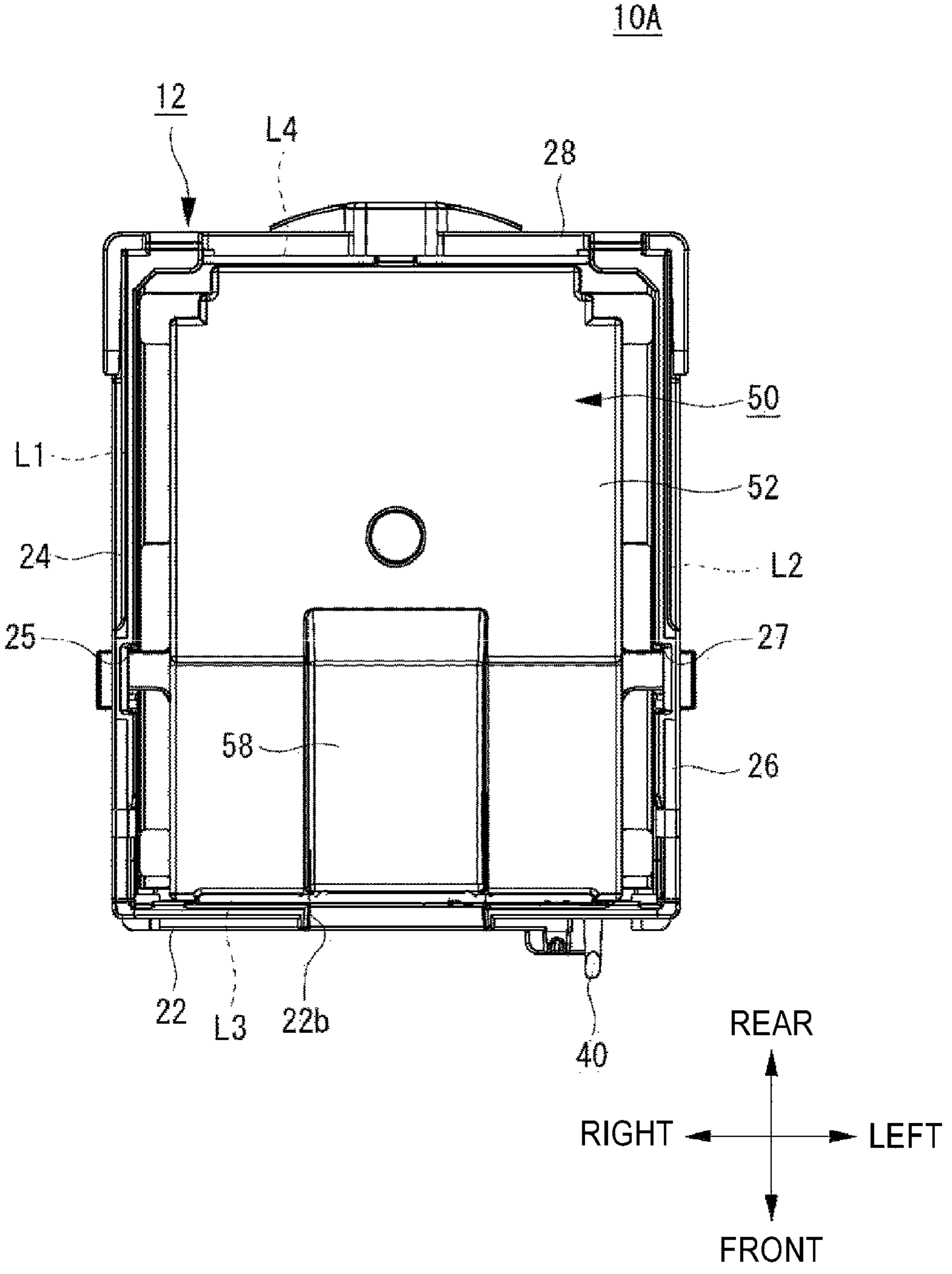
FIG. 6 is a top view of the refill.
Figure 7:
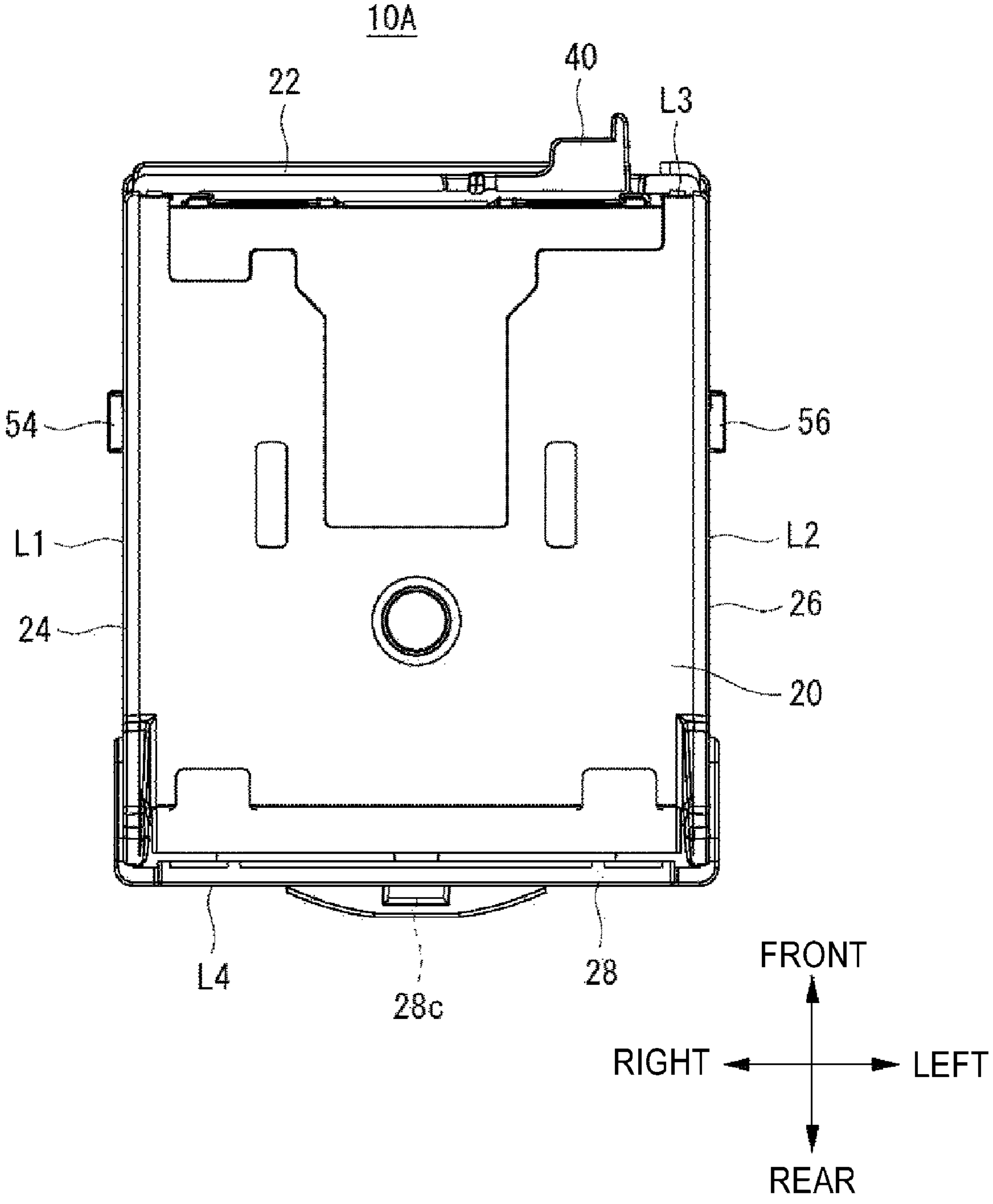
FIG. 7 is a bottom view of the refill.
Figure 8:
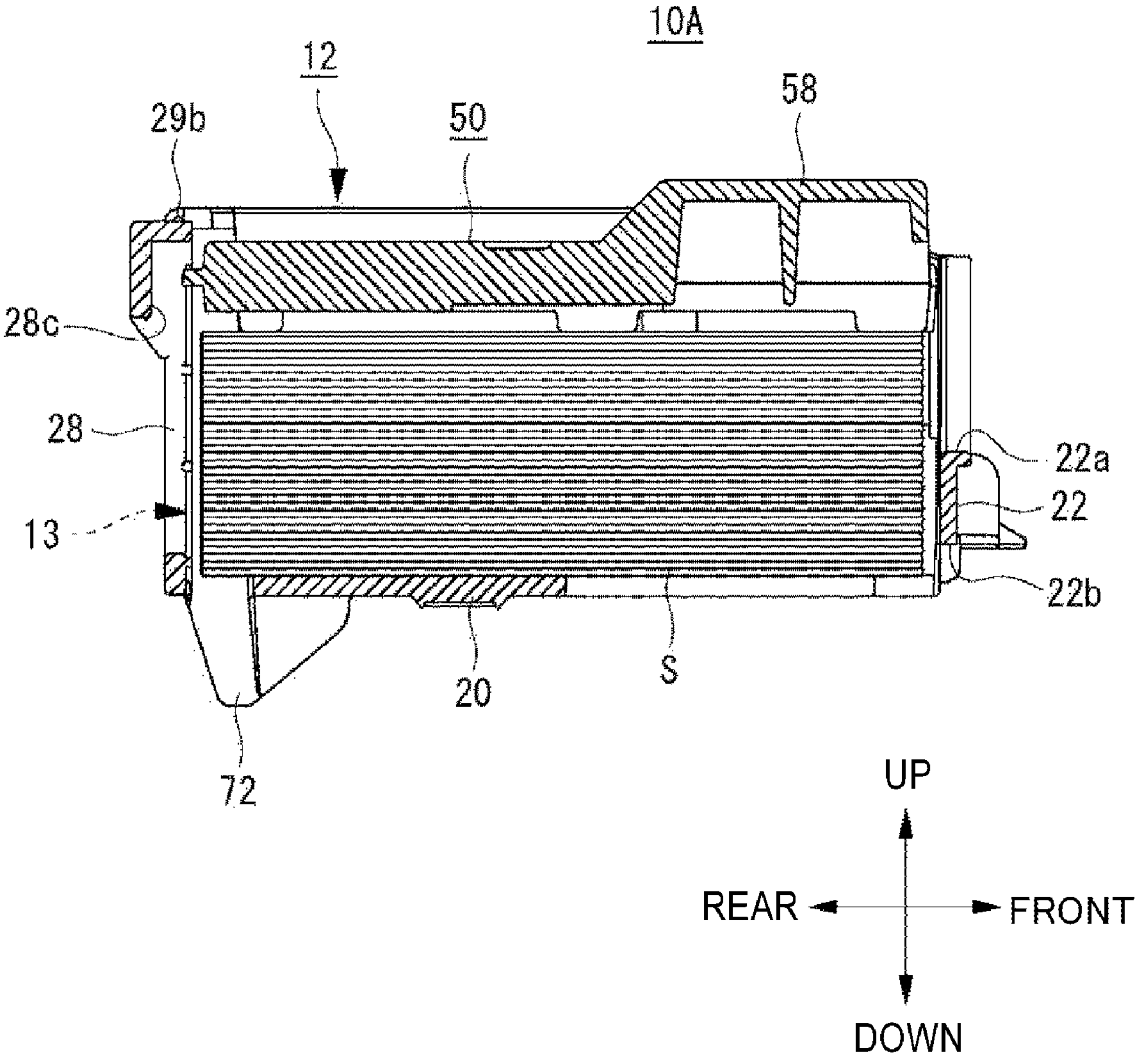
FIG. 8 is a sectional view of the refill taken along a line A-A shown in FIG. 4A.

FIG. 2 is a perspective view of an example of the refill 10A according to an embodiment of the present invention as viewed from the right front side thereof, and FIG. 3 is a perspective view of the example of the refill 10A according to an embodiment of the present invention as viewed from the left front side thereof. FIG. 4A is a front view of the refill 10A, and FIG. 4B is an enlarged view of a part X thereof. FIG. 5A is a side view of a right surface side of the refill 10A, and FIG. 5B is an enlarged view of a part Y thereof. FIG. 6 is a top view of the refill 10A, and FIG. 7 is a bottom view of the refill 10A. FIG. 8 is a sectional view of the refill 10A taken along a line A-A shown in FIG. 4A.

As shown in FIGS. 2 to 8, the refill 10A for staples includes a refill main body 12 for accommodating the stack of connected staples S therein, and a cover member 50 for covering the connected staples S accommodated in the refill main body 12 from above.

The refill main body 12 is formed of resin material and has a staple accommodating portion 14 defining a space capable of accommodating the connected staples S therein. The staple accommodating portion 14 is formed as a box-shaped body surrounded by a peripheral wall, i.e., a plurality of walls. The peripheral wall constituting the staple accommodating portion 14 includes a bottom wall 20 having a first side L1, a second side L2 opposite to the first side L1 and a third side L3 connecting end portions of the first side L1 and the second side L2; a first side wall 24 standing from the first side L1 of the bottom wall 20; a second side wall 26 standing from the second side L2 of the bottom wall 20 and opposing the first side wall 24; and a front wall 22 positioned above the third side L3 of the bottom wall 20 and connecting the first side wall 24 and the second side wall 26. It is noted that, in a case where a part corresponding to the third side is cut out, for example, as shown in FIG. 7 and thus an actual side is not present, i.e., a case where the part corresponding to the side is a void space, it is assumed that the term "third side" means an imaginary side in the void space connecting end portions of the first side L1 and the second side L2.

The staple accommodating portion 14 includes a rear wall 28 standing from a fourth side L4 of the bottom wall 20 opposite to the third side L3 and connecting the first side wall 24 and the second side wall 26. The rear wall 28 may not be integrally formed with the bottom wall. The rear wall 28 is pivotally attached on the first side wall 24 and the second side wall 26. Specifically, one end portion of an upper edge of the rear wall 28 is pivotally attached on a first hinge portion 29*a* protruding inward from a rear end portion of an upper edge of the first side wall 24, and the other end portion of the upper edge of the rear wall 28 is pivotally attached on a second hinge portion 29*b* protruding inward from a rear end portion of an upper edge of the second side wall 26. Therefore, if the rear wall 28 is pivoted upward about the first and second hinge portions 29*a*, 29*b*, a rear part of the staple accommodating portion 14 is opened to form an opening 13. On the other hand, if the rear wall 28 is pivoted downward about the first and second hinge portions 29*a*, 29*b*, the rear part of the staple accommodating portion 14 is closed by the rear wall 28.

First and second lock portions 28*a*, 28*b* having a shape of a plate bent perpendicularly to the rear wall 28 are respectively formed on a side portion of the rear wall 28 on the side of the first side wall 24 and a side portion of the rear wall 28 on the side of the second side wall 26. Accordingly, after the rear part of the staple accommodating portion 14 is closed by the rear wall 28, the first and second lock portions 28*a*, 28*b* are respectively fitted into locked portions 26*b*, 26*b*, which are respectively formed on the first side wall 24 and the second side wall 26, so that the rear wall 28 is fixed to the first side wall 24 and the second side wall 26.

The bottom wall 20 is a plate shaped member defined by the first side L1, the second side L2, the third side L3 and the fourth side L4 and having a rectangular shape in a plan view. The stack of connected staples S is placed on the bottom wall 20.

On a first boundary 32*c*, which is a connection part between the front wall 22 and the first side wall 24 and forms a corner of the refill main body 12, a first opening 32 is formed to extend across the first boundary 32*c*, that is, the first opening 32 is formed to straddle the first boundary 32*c*. The first opening 32 is an opening intended to expose one staple leg tip end of the connected staples S accommodated in the staple accommodating portion 14. The first opening 32 includes a first front wall-side opening 32*a* formed on the front wall 22 and a first side wall-side opening 32*b* formed on the first side wall 24. The first front wall-side opening 32*a* and the first side wall-side opening 32*b* are formed in a rectangular shape in a plan view and define one opening continuing across the first boundary 32*c*.

On a second boundary 34*c*, which is a connection part between the front wall 22 and the second side wall 26 and forms a corner of the refill main body 12, a second opening 34 having a shape substantially similar to that to the first opening 32 is formed. The second opening 34 is formed at substantially the same height as that of the first opening 32 and formed to extend across the second boundary 34*c*, that is, the first opening 32 is formed to straddle the second boundary 34*c*. The second opening 34 is an opening intended to expose the other staple leg tip end of the connected staples S accommodated in the staple accommodating portion 14. The second opening 34 includes a second front wall-side opening 34*a* formed on the front wall 22 and a second side wall-side opening 34*b* formed on the second side wall 26. The second front wall-side opening 34*a* and the second side wall-side opening 34*b* are formed in a rectangular shape in a plan view and define one opening continuing across the second boundary 34*c*. Meanwhile, although, in the present embodiment, the opening shape of the second opening 34 is the same as the opening shape of the first opening 32, the present invention is not limited thereto and may be configured to have opening shapes different from each other.

A third opening 22*a* is formed between the first front wall-side opening 32*a* and the second front wall-side opening 34*a* of the front wall 22. The third opening 22*a* is formed at the substantially center portion of the front wall 22 in the right-left direction. The third opening 22*a* is formed in a concave shape cut out from an upper end edge of the front wall 22 to the substantially center portion thereof in the upper-lower direction, so as to have a configuration in which an upper side thereof is opened. A length of the third opening 22*a* in the right-left direction is set to about ⅓ of a length of the front wall 22 in the right-left direction. Therefore, the substantially center portion of the connected staples S in the right-left direction stacked in the staple accommodating portion 14 can be exposed through the third opening 22*a*. Alternatively, a shape of the third opening 22*a* may have any other shape capable of exposing the center portion of the connected staples S in the right-left direction and is not limited to a rectangular shape in a plan view. Further, the upper side may not be opened.

On a lower end portion of the front wall 22, a discharging port 22*b* is formed for discharging the connected staples S accommodated in the staple accommodating portion 14.

At a location located in front of the discharging port 22*b* and on the front wall 22, which is closer to the second side wall 26 than the middle portion thereof in a direction along the third side L3, a falling prevention portion 40 is provided for preventing the connected staples S from being discharged from the discharging port 22*b* to the outside when not in use (when the refill 10A is not loaded to the cartridge 100). As shown in FIG. 4A, the falling prevention portion 40 has a hinge portion 42 protruding from the front wall 22 and a locking piece 44 connected to the hinge portion 42 and configured to be pivotable about the hinge portion 42. The locking piece 44 is configured to partially open or close the discharging port 22*b* by pivoting. When the connected staples S are discharged, the locking piece 44 is pivoted in a direction, in which the locking piece 44 is retracted from a position in front of the discharging port 22*b*, i.e., in a direction opening the discharging port 22*b*. On the other hand, when the connection staples S are not discharged, the locking piece 44 is positioned in front of the discharging port 22*b*, thereby closing the discharging port 22*b*. When the refill 10A is loaded to the cartridge 100, the locking piece 44 abuts against a protrusion 122*a* provided in the cartridge 100 and thus is pivoted toward a direction opening the discharging port 22*b*.

If the locking piece 44 abuts against and is pressed by the protrusion 122*a*, the force thereof is also transmitted to the front wall 22 via the hinge portion 42. Therefore, if the rigidity of the front wall 22 is low, the front wall 22 is likely to be deformed by a pressing force from the protrusion 122*a*. For example, if the falling prevention portion 40 is provided in the vicinity of the middle portion of the front wall 22, which is low in rigidity due to the third opening portion 22*a* formed therein, the front wall 22 is likely to be deformed when the locking piece 44 abuts against the protrusion 122*a*, so that the pressing force of the protrusion 122*a* is not properly transmitted to the locking piece 44. If the pressing force of the protrusion 122*a* is not properly transmitted to the locking piece 44, the locking piece 44 is not sufficiently pivoted and thus cannot open the discharging port 22*b*. Accordingly, in the present embodiment, the falling prevention portion 40 is arranged such that the hinge portion 42 is positioned at a location on the front wall 22 closer to the second side wall 26, which has a higher rigidity, than the middle portion thereof, more specifically between the third opening portion 22*a* and the third boundary 34*c*. Alternatively, the falling prevention portion 40 may be arranged at a location on the front wall 22, which is close to the first side wall 24 rather than the second side wall 26.

In the substantially center portions of the first side wall 24 and the second side wall 26 in the front-rear direction, a first guide hole 25 and a second guide hole 27 are respectively formed to extend in the upper-lower direction. The first and second guide holes 25, 27 are configured to allow the cover member 50 to be attached thereto and guide the cover member 50 moving in accordance with an amount of the connected staples S accommodated in the staple accommodating portion 14. The first and second guide holes 25, 27 are respectively configured by horizontal guide holes 25*a*, 27*a* provided in the vicinity of upper end portions of the first side wall 24 and the second side wall 26, and vertical guide holes 25*b*, 27*b* extending downward from the horizontal guide holes 25*a*, 27*a*. The horizontal guide holes 25*a*, 27*a* are sized to allow wide portions 54*b*, 56*b* of first and second engaging portions 54, 56 of the cover member 50, as described below, to be inserted therein or removed therefrom. The vertical guide holes 25*b*, 27*b* are formed to have a width narrower than a length of the wide portions 54*b*, 56*b* of the first and second engaging portions 54, 56 of the cover member 50 in the front-rear direction. In this manner, the cover member 50 can be moved within the staple accommodating portion 14 in the upper-lower direction while preventing the cover member 50 from falling from the refill main body 12.

On one end side, in the right-left direction, of the bottom wall 20, which corresponds to a rear part thereof, a first protrusion portion 70 is formed to protrude downward from the bottom wall 20. The first protrusion portion 70 is a plate-shaped member having a generally triangular shape in a plan view and having substantially the same thickness as that of the first side wall 24. The first protrusion portion 70 is integrally formed on the first side wall 24 such that a plane thereof is generally flush with the first side wall 24. The first protrusion portion 70 is formed on the bottom wall 20 such that one side thereof extends along the first side L1 of the bottom wall 20 and a corner thereof defined by other two sides extends downward.

On the other end side, in the right-left direction, of the bottom wall 20, which also corresponds to the rear part thereof, a second protrusion portion 72 protruding downward from the bottom wall 20 is provided to oppose the first protrusion portion 70 in the right-left direction. The second protrusion portion 72 is a plate-shaped member having a generally triangular shape in a plan view and having substantially the same thickness as that of the second side wall 26. The second protrusion portion 72 is integrally formed on the second side wall 26 such that a plane thereof is generally flush with the second side wall 26. The second protrusion portion 72 is formed on the bottom wall 20 such that one side thereof extends along the second side L2 of the bottom wall 20 and a corner thereof defined by other two sides extends downward. Meanwhile, the first and second protrusion portions 70, 72 are not limited to the triangular shape, but may have a rectangular shape.

By providing the first and second protrusion portions 70, 72 on the bottom wall 20, the refill main body 12 becomes an inclined state, in which a rear part thereof is lifted, when the refill 10A is placed on a work table. Therefore, when connected staples S are inserted into the staple accommodating portion 14 of the refill main body 12, the connected staples S can be easily inserted into the staple accommodating portion 14. Also, when the refill 10A falls, the first and second protrusion portions 70, 72 provided on the bottom wall 20 serve as a structure of receiving an impact, so that damage of the refill main body 12 and the like can be prevented. In particular, in a case of a structure, in which the rear wall 28 is pivotally attached to the first and second hinge portions 29*a*, 29*b* as in the present embodiment, the rear wall 28 is prone to be damaged due to falling. However, by providing the first and second protrusion portions 70, 72 in the vicinity of the rear wall 28, the rear wall 28 can be prevented from directly colliding against a floor or the like upon falling.

As shown in FIGS. 2 to 8, the cover member 50 includes a main body 52 and first and second engaging portions 54, 56. The main body 52 is a plate-shaped member formed of a resin material and has a rectangular shape in a plan view slightly smaller than an opening area of an opening 15 of the staple accommodating portion 14, which is opened upward, so that the main body 52 can be fitted into the opening 15. The cover member 50 is configured to be removably attached to the staple accommodating portion 14.

The first engaging portion 54 has a narrow portion 54*a* extending outward from one side portion of the main body 52 (side portion thereof located on the side of the first side wall 24), and a wide portion 54*b* continuous to a distal end of the narrow portion 54*a* and having a width in the front-rear direction formed to be wider than that of the narrow portion 54*a*. When the cover member 50 is mounted on the refill main body 12, the narrow portion 54*a* is inserted through the horizontal guide hole 25*a* of the guide hole 25 of the first side wall 24, and the wide portion 54*b* protruding outward from the first side wall 24 passes through the vertical guide hole 25*b* of the guide hole 25 of the first side wall 24 and then is locked on the outer surface thereof.

Similarly, the second engaging portion 56 has a narrow portion 56*a* extending outward from the other side portion of the main body 52 (side portion thereof located on the side of the second side wall 26), and a wide portion 56*b* continuous to a distal end of the narrow portion 56*a* and having a width in the front-rear direction formed to be wider than that of the narrow portion 56*a*. When the cover member 50 is mounted on the refill main body 12, the narrow portion 56*a* is inserted through the horizontal guide hole 27*a* of the guide hole 27 of the second side wall 26, and the wide portion 56*b* protruding outward from the second side wall 26 passes through the vertical guide hole 27*b* of the guide hole 27 of the second side wall 26 and then is locked on the outer surface thereof.

The cover member 50 has a third protrusion portion 58 located on a front portion of an upper surface of the main body 52 at the substantially center portion of the main body 52 in the right-left direction. The third protrusion portion 58 protrudes from the upper surface of the main body 52 in a generally rectangular parallelepiped shape. A length of the third protrusion portion 58 in the right-left direction is set to be about ⅓ of a length of the main body 52 in the right-left direction and to be substantially the same as an opening width of the third opening 22*a* of the front wall 22.

A top surface of the third protrusion portion 58 is configured to take a position higher than upper edge portions (upper surfaces) of the first side wall 24 and the second side wall 26 when the maximum amount of the connected staples S is stacked in the staple accommodating portion 14. Therefore, when the refill 10A is taken out from a packaged state, a user can grip the third protrusion portion 58 and thus can easily take the refill 10A out of a packaging. Further, when the refill 10A falls in a state where the cover member 50 is directed downward, the third protrusion portion 58 servers as a structure for first receiving an impact, so as to prevent damage of the refill main body 12, the connected staples S accommodated therein and the like.

[Exemplary Opening Dimensions of First Front Wall-Side Opening 32*a*]

In the present embodiment, as shown in FIGS. 4A and 4B, a length W1 of the first front wall-side opening 32*a* of the first opening 32 in a direction along the third side L3 of the bottom wall 20 is set to 0.8 mm. Specifically, the length W1 of the first front wall-side opening 32*a* along the third side L3 between an inner surface 24*c* of the first side wall 24 and an inner opening edge 22*e* of the first front wall-side opening 32*a* is set to 0.8 mm. However, the dimension (0.8 mm) is merely an example. After extensive and intensive studies on the opening dimension of the first front wall-side opening 32*a*, the inventors have found that, in order to visually check a state of a staple leg tip end of the connected staples S through the first front wall-side opening 32*a*, it is preferable to set the length W1 to at least 0.3 mm (i.e., to set the length W1 to 0.3 mm or greater). Accordingly, it is preferable to set the length W1 to at least 0.3 mm.

Meanwhile, although in the example shown in FIGS. 4A and 4B, the opening shape of the first front wall-side opening 32*a* is a rectangular shape in a plan view, it is not necessary to limit the opening shape to the rectangular shape as long as the staple leg tip end of the connected staples S can be visually checked. Therefore, for example, the opening shape may be a semicircular shape in a plan view. However, in this case, a value of the length W1 varies depending on a position in the upper-lower direction, at which the length W1 is measured. Accordingly, the length W1 is designed such that the maximum value (a value at the greatest part thereof) is 0.3 mm or greater.

Further, the same dimension as that of the first front wall-side opening 32*a* can be also employed for the second front wall-side opening 34*a* of the second opening 34 provided symmetrically with the first opening 32. Specifically, a length of the second front wall-side opening 34*a* of the second opening 34 in a direction along the third side L3 of the bottom wall 20 is designed to be 0.3 mm or greater. Meanwhile, the other dimensions and the like of the second front wall-side opening 34*a* are similar to those of the first front wall-side opening 32*a*, and accordingly, the detailed description thereof will be omitted.

[Exemplary Opening Dimensions of First Side Wall 24 Side Opening 32*b*]

In the present embodiment, as shown in FIGS. 5A and 5B, a length W2 of the first side wall-side opening 32*b* of the first opening 32 in a direction along the first side L1 of the bottom wall 20 is set to 3.5 mm. Specifically, the length W2 of the first side wall-side opening 32*b* along the first side L1 between an inner surface 22*c* of the front wall 22 and a rear opening edge 24*e* of the first side wall-side opening 32*b* is set to 3.5 mm. Herein, although in the present embodiment, the length W2 is set to 3.5 mm, the inventors have found that if the length W2 is at least 0.7 mm (i.e., the length W2 is 0.7 mm or greater), a measuring part (jaw) of a measuring instrument, such as a vernier caliper, can be brought into contact with the staple leg tip end of the connected staples S exposed through the first side wall-side opening 32*b*. Further, if the length W2 is 0.7 mm, it is possible to visually check a state of the staple leg tip end of the connected staples S through the first side wall-side opening 32*b* in an axial direction of staples (transversal direction). Accordingly, it is preferable to set the length W2 to at least 0.7 mm.

Meanwhile, similarly to the opening shape of the first front wall-side opening 32*a*, an opening shape of the first side wall-side opening 32*b* is not limited to a rectangular shape in a plan view. For example, in a case where the opening shape is a semicircular shape, the opening dimension of the first side wall-side opening 32*b* is designed such that the maximum value of the length W2 is 0.7 mm or greater.

Further, the same dimension as that of the first side wall-side opening 32*b* can be also employed for the second side wall-side opening 34*b* of the second opening 34 provided symmetrically with the first opening 32. Specifically, a length of the second side wall-side opening 34*b* of the second opening 34 in a direction along the second side L2 of the bottom wall 20 is designed to be 0.7 mm or greater. Meanwhile, the other dimensions, shapes and the like of the second side wall-side opening 34*b* are similar to those of the first side wall-side opening 32*b*, and accordingly, the detailed description thereof will be omitted.

In the present embodiment, as shown in FIG. 5B, a length (height) M1 of the first side wall-side opening 32*b* in a direction along the first boundary 32*c*, i.e., the length M1 of the first side wall-side opening 32*b* in the upper-lower direction is set to 5 mm. However, since the length M1 has a value determined in consideration of a thickness of a measuring part of a vernier caliper or the like, it is preferable to set the length M1 to at least 0.7 mm in order to allow the measuring parts of the vernier caliper or the like to be inserted in the first side wall-side opening 32*b*. In other words, by setting the length M1 to 0.7 mm or greater, it is possible to secure a space required for inserting the measuring parts of the vernier caliper or the like and then measuring a dimension of the connected staples S. Further, an opening allowing the staple leg tip end of the connected staples S to be visually checked can also be sufficiently secured, so as to make it possible to measure, observe and inspect more connected staples S.

Further, the same dimension as that of the first side wall-side opening 32*b* can be also employed for the second side wall-side opening 34*b* of the second opening 34 provided symmetrically with the first opening 32. Specifically, a length of the second side wall-side opening 34*b* in a direction along the second boundary 34*c* is designed to be 0.7 mm or greater. Meanwhile, the other dimensions and the like of the second side wall-side opening 34*b* are similar to those of the first side wall-side opening 32*b*, and accordingly, the detailed description thereof will be omitted.

[Exemplary Dimension from First Front Wall-side Opening 32*a* to Second Front Wall-side Opening 34*a*]

As shown in FIG. 4A, a length W3 from the first front wall-side opening 32*a* to the second front wall-side opening 34*a*, specifically, a length W3 from an inner opening edge 22*e*1 of the first front wall-side opening 32*a* to an inner opening edge 22*e*2 of the second front wall-side opening 34*a* is configured to be smaller than a length W4 of the connected staples S in a direction along the third side L3 of the bottom wall 20 in a state where the connected staples S are accommodated in the staple accommodating portion 14. Therefore, in the state where the connected staples S are accommodated in the staple accommodating portion 14, both staple leg tip ends of the connected staples S can be respectively exposed through the first front wall-side opening 32*a* and the second front wall-side opening 34*a*.

[Exemplary Configuration of Cartridge 100]

Figure 9A:
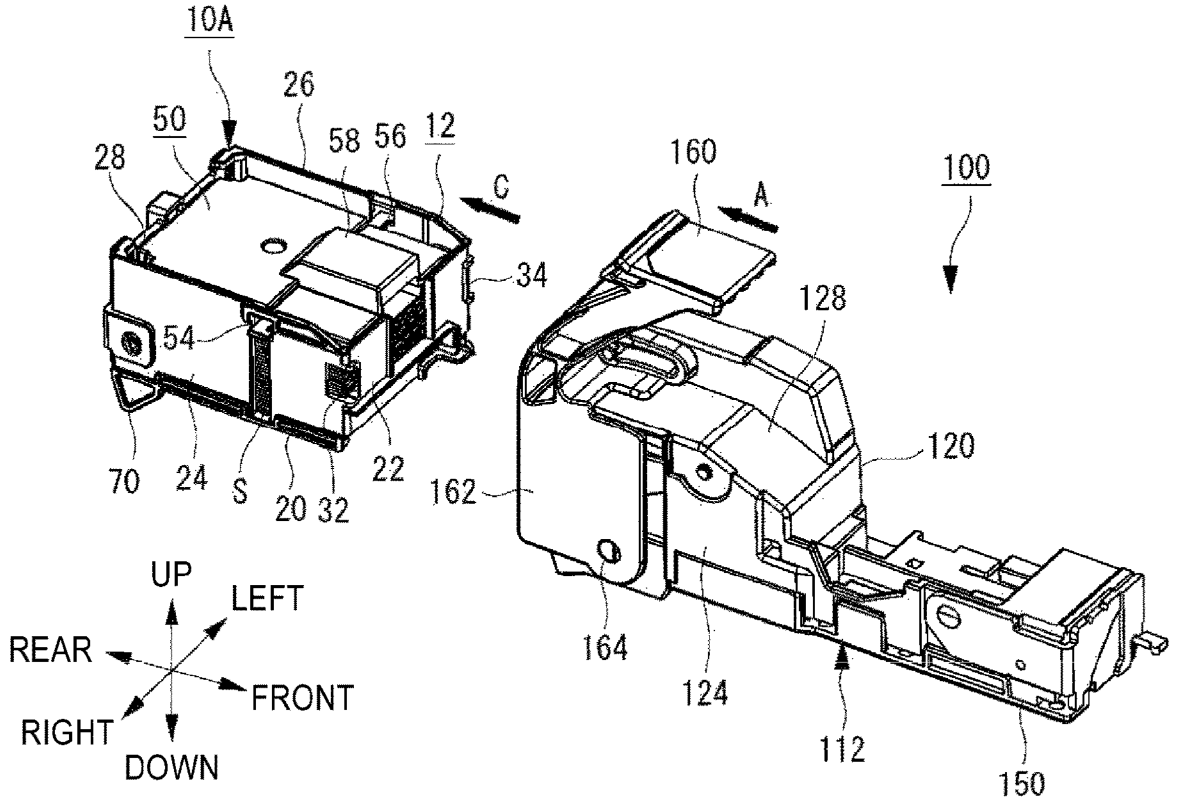
FIG. 9A is a perspective view of a cartridge, on which the refill according to an embodiment of the present invention is to be loaded, as viewed from a right outer surface side thereof.
Figure 9B:
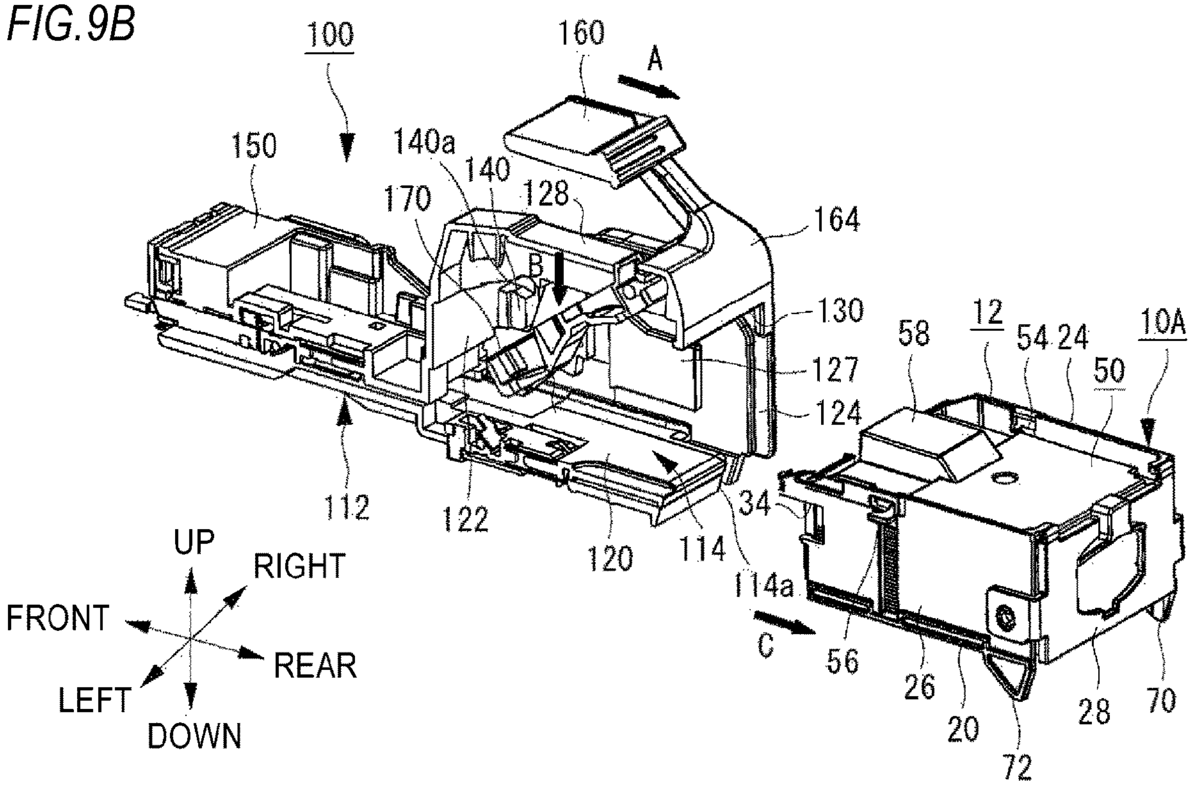
FIG. 9B is a perspective view of the cartridge as viewed from a right inner surface side thereof.
Figure 10A:
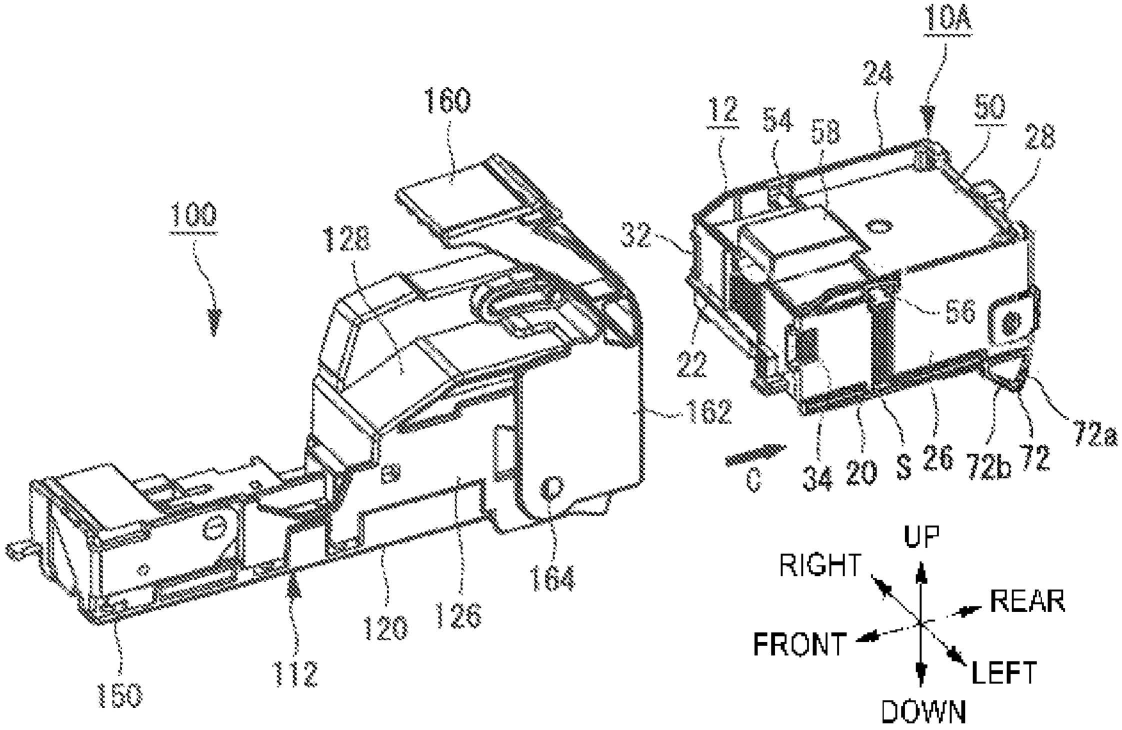
FIG. 10A is a perspective view of the cartridge, on which the refill according to an embodiment of the present invention is to be loaded, as viewed from a left outer surface side thereof.
Figure 10B:
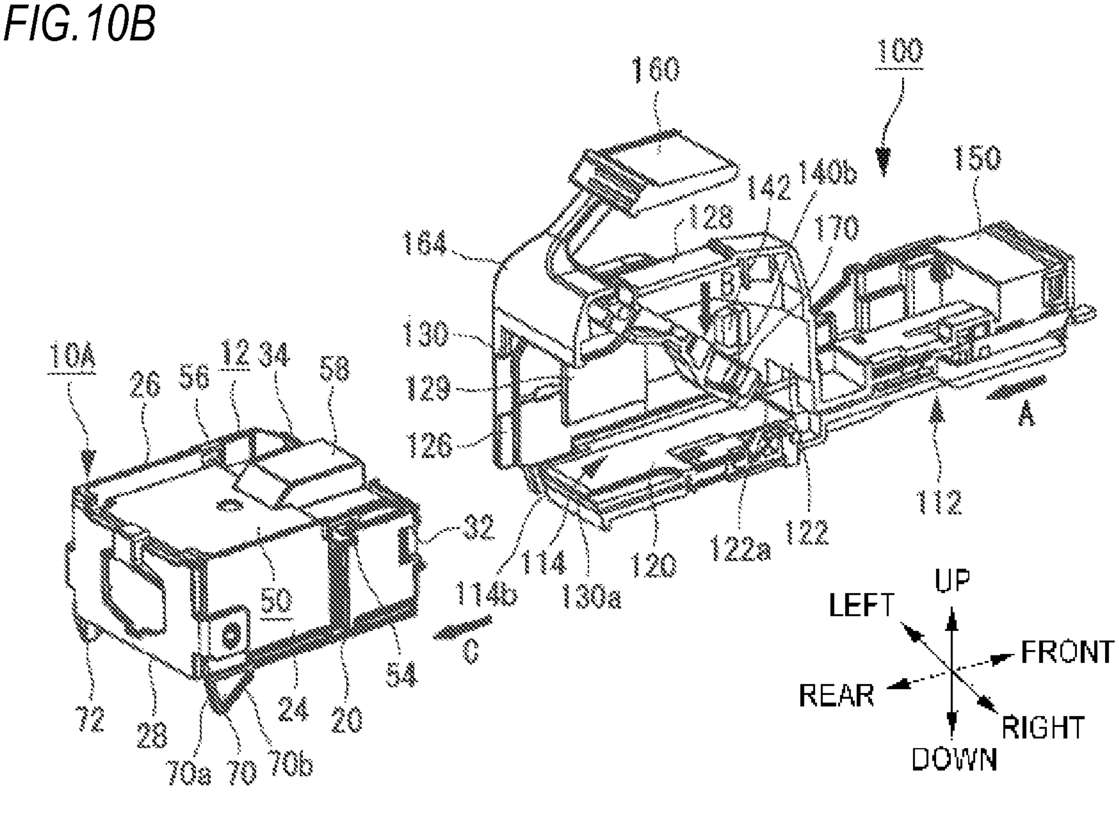
FIG. 10B is a perspective view of the cartridge as viewed from a left inner surface side thereof.
Figure 11:
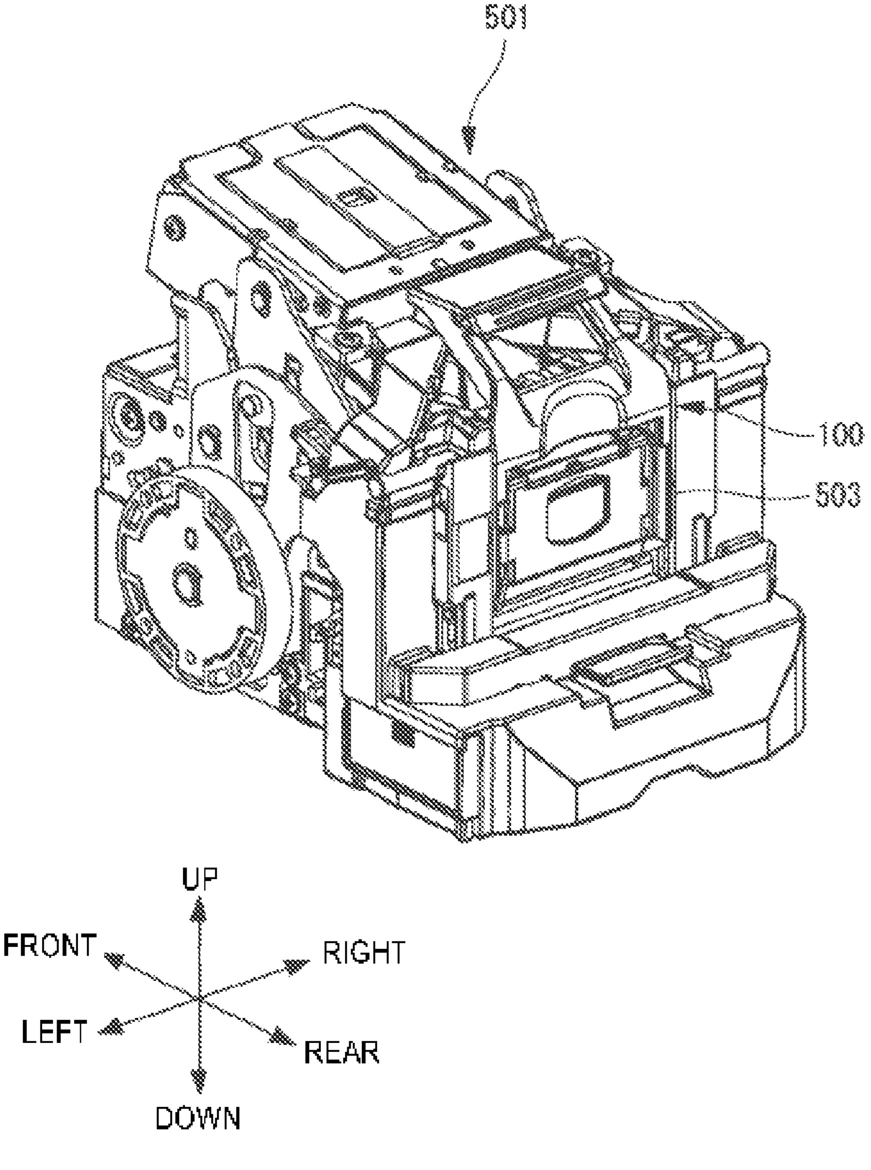
FIG. 11 is a perspective view showing a state where the cartridge is received in a cartridge receiving portion of a stapler main body.
Figure 12:
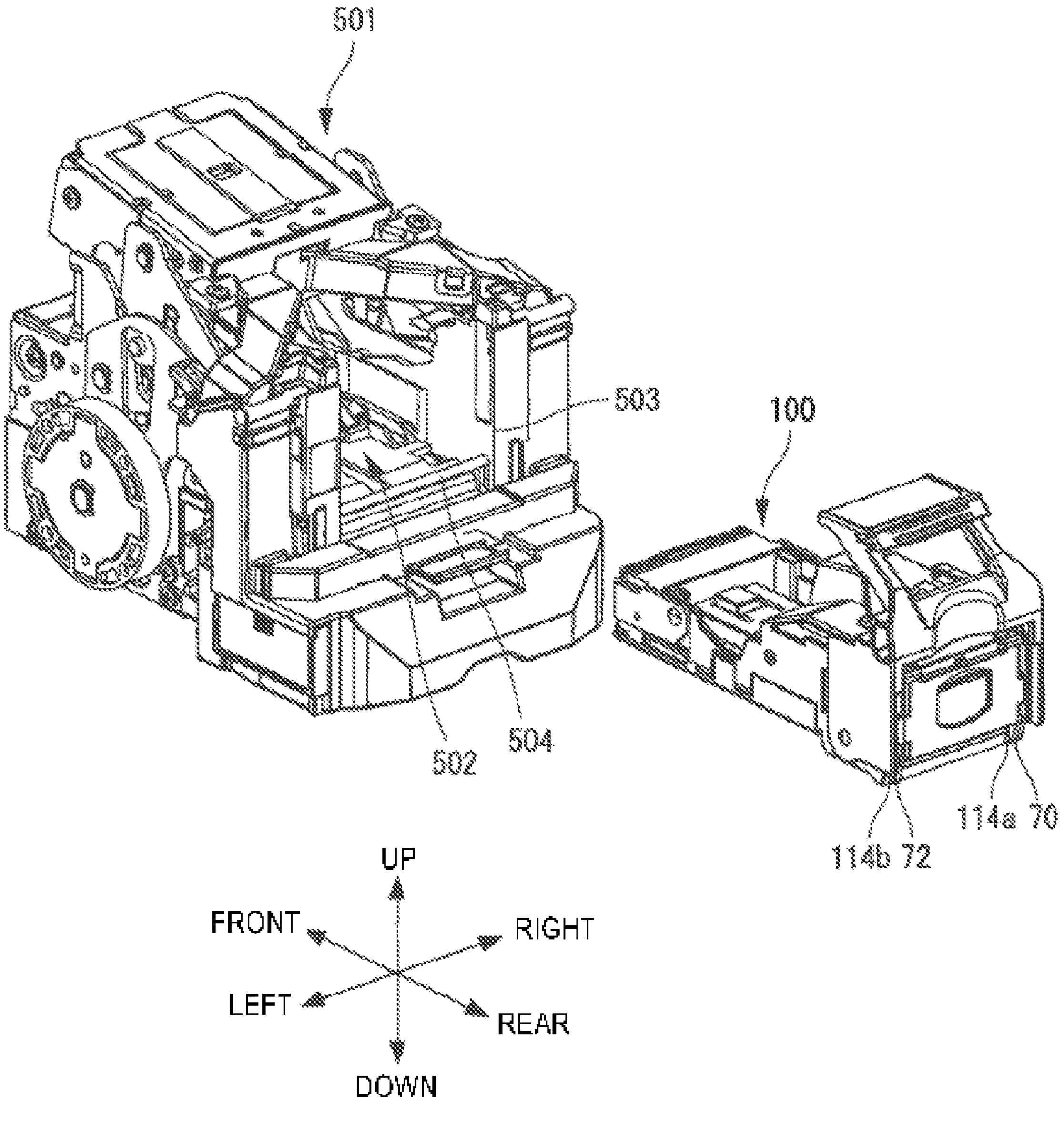
FIG. 12 is a perspective view showing a state before the cartridge is received in the cartridge receiving portion of the stapler main body.

FIG. 9A is a perspective view of a cartridge 100, on which the refill 10A according to an embodiment of the present invention is to be mounted, as viewed from a right outer surface side thereof, and FIG. 9B is a perspective view of the cartridge 100 as viewed from a left inner surface side thereof. FIG. 10A is a perspective view of the cartridge 100, on which the refill 10A according to an embodiment of the present invention is to be mounted, as viewed from a left outer surface side thereof, and FIG. 10B is a perspective view of the cartridge 100 as viewed from a right inner surface side thereof. FIG. 11 is a perspective view showing a state where the cartridge 100 is received in a cartridge receiving portion 502 of a stapler main body 501. FIG. 12 is a perspective view showing a state before the cartridge 100 is received in the cartridge receiving portion 502 of the stapler main body 501.

As shown in FIGS. 9A, 9B, 10A and 10B, the cartridge 100 includes a cartridge main body 112, a striking unit 150, an operating unit 160 and a pressing member 170.

The cartridge main body 112 is configured to be removably attached on a stapler main body (not shown) and includes a refill receiving portion 114, on which the refill 10A can be mounted.

The refill receiving portion 114 is provided on a rear part of the cartridge main body 112 and has a space (recess portion) capable of receiving the refill 10A therein. The refill receiving portion 114 includes an end wall 122 standing on the most inner side of the recess portion (inner side thereof in an inserting direction of the refill 10A) and provided at a location opposing the front wall 22 of the refill 10A when the refill 10A is mounted thereon; a bottom wall 120 extending from a lower side of the end wall 122 toward a rear side of the cartridge main body 112; a third side wall 124 standing from one side of the bottom wall 120, which extends along an inserting/removing direction of the refill 10A (standing from one side of the end wall 122); a fourth side wall 126 standing from another side of the bottom wall 120 opposite to the one side thereof (standing from another side of the end wall 122 opposite to the one side thereof) and thus opposing the third side wall 124; and a top wall 128 opposing the bottom wall 120 and connected to the end wall 122, the third side wall 124 and the fourth side wall 126. On the rear part of the refill receiving portion 114, an opening 130 is formed to allow the refill 10A to be inserted therein or removed therefrom.

A fourth protrusion portion (protrusion, first protrusion) 140 is formed on a third boundary 140*a* which is a connection part between an inner surface of the end wall 122 and an inner surface of the third side wall 124 and forms a corner of the refill receiving portion 114. The fourth protrusion portion 140 protrudes to extend across the third boundary 140*a* and is formed at a location opposing the first opening 32 of the refill 10A mounted on the cartridge 100 (refill receiving portion 114). The fourth protrusion portion 140 has a shape to which the first opening 32 of the refill 10A can be fitted when the refill 10A is mounted on the cartridge 100.

A fifth protrusion portion (second protrusion) 142 is formed on a fourth boundary 140*b* which is a connection part between the inner surface of the end wall 122 and an inner surface of the fourth side wall 126 and forms a corner of the refill receiving portion 114. The fifth protrusion portion 142 protrudes to extend across the fourth boundary 140*b* and is formed at a location opposing the second opening 34 of the refill 10A loaded to the cartridge 100. The fifth protrusion portion 142 has a shape to which the second opening 34 of the refill 10A can be fitted when the refill 10A is mounted on the cartridge 100.

When the refill 10A is mounted on the cartridge 100, the fourth and fifth protrusion portions 140, 142 are fitted into the first and second openings 32, 34. Since the fourth and fifth protrusion portions 140, 142 are fitted in the first and second openings 32, 34, it is possible to position the refill 10A inside the refill receiving portion 114 and to prevent the refill 10A from rattling inside the refill receiving portion 114 (in particular, rattling in the upper-lower direction).

The striking unit 150 is provided in front of the refill receiving portion 114 and is configured to shape a staple, which is located on a leading end portion of a connected staple S conveyed from the refill 10A, into a U-shape by a forming plate, to strike the formed staple into sheets of paper by a driver plate, and then to clinch the staple penetrating the sheets of paper, so as to perform a binding process.

Figure 30:
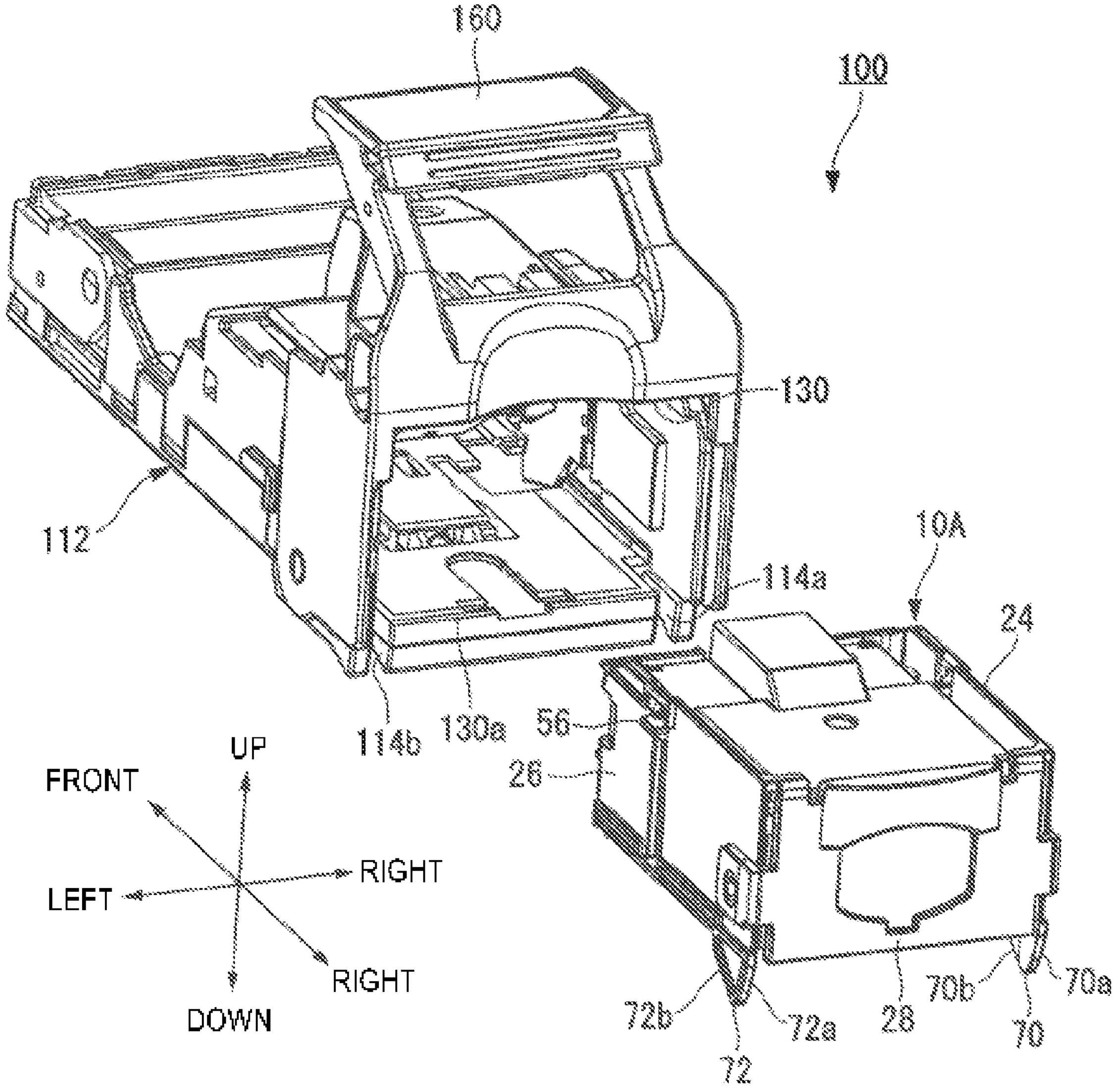
FIG. 30 is a perspective view of the refill and the cartridge before the refill is loaded to the cartridge.
Figure 31:
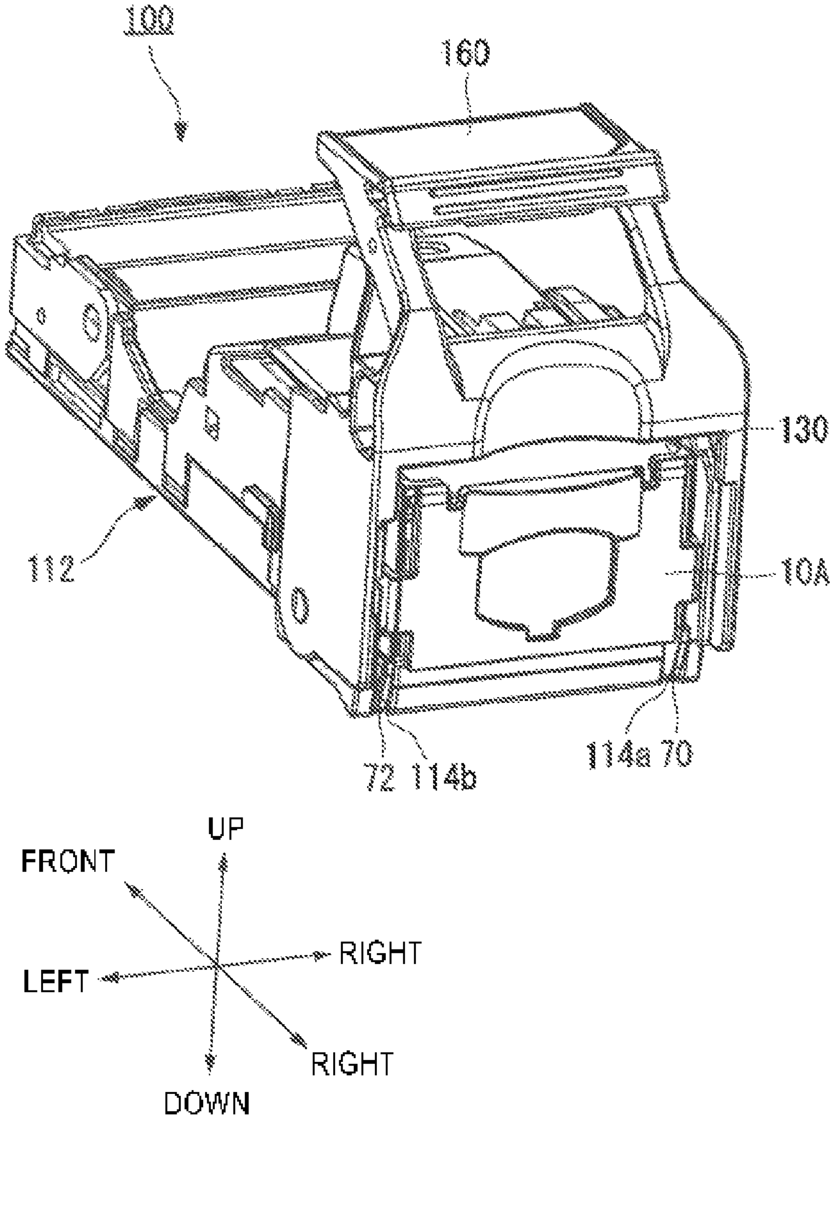
FIG. 31 is a perspective view of the refill and the cartridge after the refill is loaded to the cartridge.

As shown in FIGS. 9, 10 and 30, the opening 130 of the refill receiving portion 114 has a generally rectangular shape, and notches 114*a*, 114*b* are respectively formed on both ends of one side of the opening 130, specifically a bottom side 130*a* of the opening 130, more specifically a bottom side 130*a* of the opening 130 forming an end edge of the bottom wall 120, which is located on the side of the opening 130. The notches 114*a*, 114*b* are cut out up to a predetermined depth (length) in a depth direction of the refill receiving portion 114. As shown in FIG. 31, the notches 114*a*, 114*b* are respectively formed to allow the first and second protrusion portions 70, 72 of the refill 10A to be fitted therein when the refill 10A is inserted into the refill receiving portion 114. Therefore, the depth (length) of the notches 114*a*, 114*b* are set to be equal or approximate to a length of a bottom side of the first and second protrusion portions 70, 72, and a width of the notches 114*a*, 114*b* are set to be equal to or greater than a plate thickness of the first and second protrusion portions 70, 72. Since the first and second protrusion portions 70, 72 are fitted in the notches 114*a*, 114*b*, the refill 10A is positioned in the right-left direction inside the refill receiving portion 114.

Figure 32:
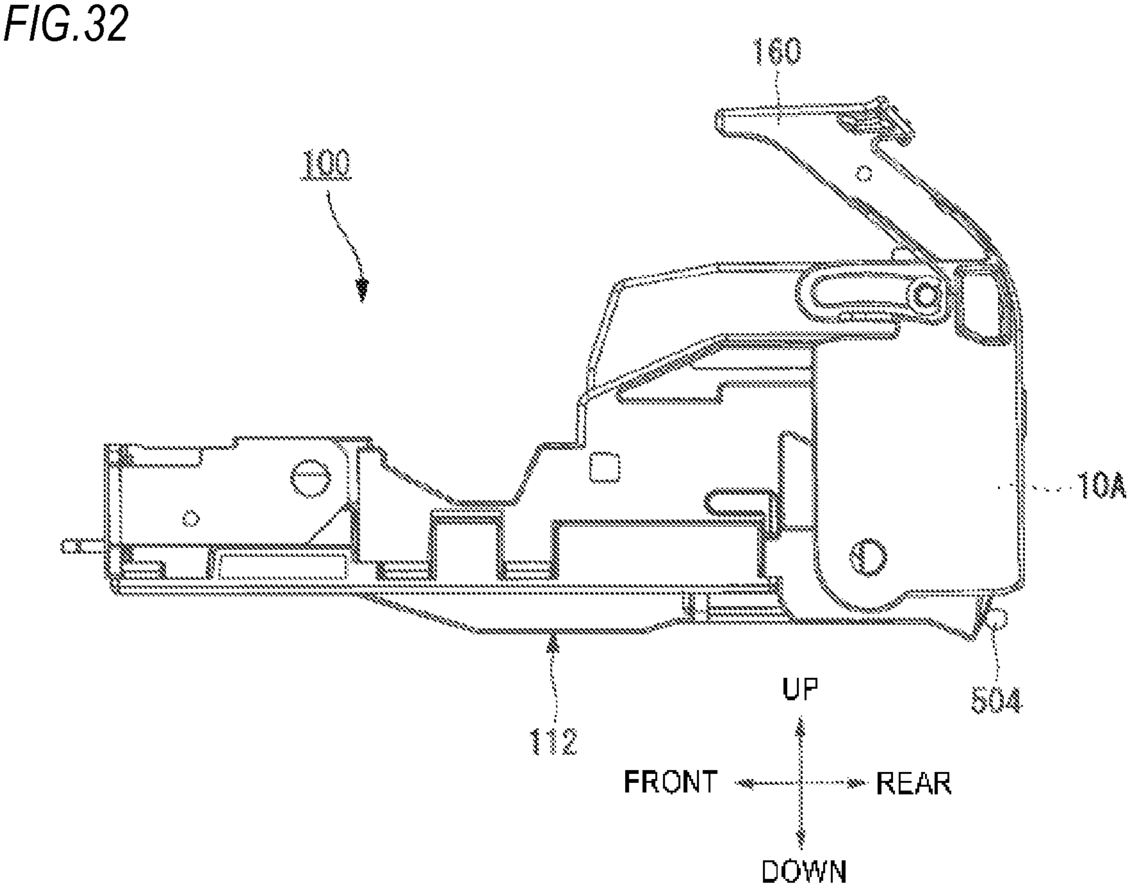
FIG. 32 is a side view of the cartridge and a locking shaft.
Figure 33:
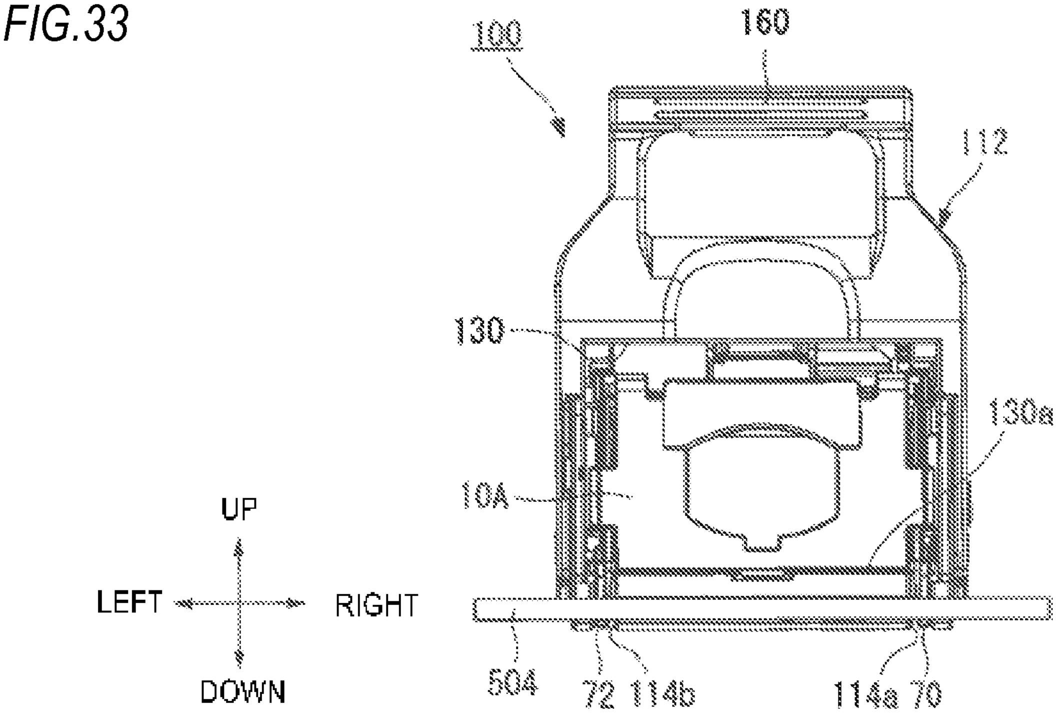
FIG. 33 is a rear view of the cartridge and the locking shaft.

As shown in FIG. 12, the stapler main body 501 includes a cartridge receiving portion 502 capable of receiving the cartridge 100 therein. The cartridge receiving portion 502 has a generally rectangular opening 503 allowing the cartridge 100 to be inserted therein/removed therefrom. An elongated locking shaft 504 arranged to extend along a bottom side of the opening 503 is provided on a lower side of the opening 503. When the cartridge 100 is accommodated into the cartridge receiving portion 502, the locking shaft 504 extend along the bottom side 130*a* of the opening 130 of the refill receiving portion 114. The locking shaft 504 extends at least from one notch 114*a* to the other notch 114*b* when the cartridge 100 is mounted. The locking shaft 504 is configured to be movable in the upper-lower direction, i.e., in directions approaching and separating from the opening 503 and is urged upward (in the direction approaching the opening 503) by an elastic member. As shown in FIGS. 32 and 33, the locking shaft 504 is arranged at a location where the first and second protrusion portions 70, 72 of the refill 10A protruding downward through the notches 114*a*, 114*b* of the refill receiving portion 114 when the cartridge 100 is mounted on the cartridge receiving portion 502 abuts against. Since the first and second protrusion portions 70, 72 have a generally triangular shape in a plan view, oblique sides (inclined surfaces) 70*b*, 72*b* of the first and second protrusion portions 70, 72 having such a generally triangular shape move over the locking shaft 504 while pushing the locking shaft 504 downward against the elastic member, if the cartridge 100 is pushed into the cartridge receiving portion 502 with a predetermined force after the first and second protrusion portions 70, 72 abut against the locking shaft 504. After the first and second protrusion portions 70, 72 move over the locking shaft 504, the locking shaft 504 is moved back upward by the elastic member and is located at the place opposing to the rear surface portions 70*a*, 72*a* of the first and second protrusion portions 70, 72. In this way, the cartridge 100 and the refill 10A are prevented from being removed from the cartridge receiving portion 502.

The operating unit 160 is provided above the cartridge main body 112 and is pivotally attached on shaft portions 164, 164, which are respectively provided on outer surfaces of the third side wall 124 and the fourth side wall 126 of the refill receiving portion 114, via a pair of link members 162, 162. By pulling the operating unit 160 in a direction opposite to an advancing direction of the connected staples S (direction of an arrow A), the operating unit 160 is pivoted about the shaft portions 164, 164 so that the cartridge 100 can be removed from the stapler main body.

The pressing member 170 is configured to press the cover member 50 of the refill 10A loaded to the cartridge 100 (in the present embodiment, to press the third protrusion portion 58 of the cover member 50). Therefore, the connected staples S stacked in the refill 10A are kept pressed via the cover member 50. The pressing member 170 is a generally rectangular parallelepiped member provided to protrude from the top wall 128 of the refill receiving portion 114, and one end side thereof is pivotally attached on a rear part side of the top wall 126 of the refill receiving portion 114. The other end side of the pressing member 170 extends obliquely downward toward the end wall 122. An elastic member (not shown), such as a coil spring, is inserted between the substantially center portion of the pressing member 170 in an extending direction thereof and the top wall 128, so that the pressing member 170 is pivotally urged toward the bottom wall 120 (direction of an arrow B).

[Example of Operation when Refill 10A is Loaded to the Cartridge 100]

Hereinafter, an example of operation when the refill 10A is loaded to the cartridge 100 will be described with reference to FIGS. 2 to 10. First, while the cover member 50 is not attached on the refill main body 12 and the rear wall 28 is opened, a stack of connected staples S is inserted through the opening 13 of the rear side of the refill main body 12. At this time, if the refill 10A is placed on a work table, the rear part of the refill main body 12 is lifted and inclined by the first and second protrusion portions 70, 72 provided on the bottom wall 20 of the refill main body 12, so as to allow the connected staples S to be smoothly inserted into the staple accommodating portion 14.

Subsequently, the first engaging portion 54 of the cover member 50 is inserted through the horizontal guide hole 25*a* of the first guide hole 25 of the first side wall 24, and the second engaging portion 56 is inserted through the horizontal guide hole 27*a* of the second guide hole 27 of the second side wall 26. Then, the cover member 50 is placed on the upper most layer of the connected staples S accommodated in the staple accommodating portion 14. Accordingly, the cover member 50 is attached to the staple accommodating portion 14. Subsequently, the rear wall 28 is closed while a protrusion portion 60 of the cover member 50 is engaged in a recess portion 28*c* of the rear wall 28. Accordingly, the refill 10A becomes a finished product.

Subsequently, the refill 10A, in which the connected staples S are accommodated, is inserted into the refill receiving portion 114 of the cartridge 100 using the front wall 22 of the refill 10A as an insertion face. In the present embodiment, as the refill 10A is advanced into the refill receiving portion 114, the pressing member 170 of the cartridge 100 enters through the third opening 22*a* of the front wall 22 and then rides on the third protrusion portion 58 of the cover member 50. Since the pressing member 170 serves to press the cover member 50 downward by the elastic member, the stack of connected staples S is continuously pressed via the cover member 50 even if the connected staples S are reduced.

On the third side wall 124 and the fourth side wall 126 of the refill receiving portion 114, first and second lock mechanisms 127, 129 having a generally rectangular parallelepiped shape are respectively formed to protrude inward therefrom. When the refill 10A is inserted into the refill receiving portion 114, the first and second engaging portions 54, 56 of the cover member 50 move along upper edges of the first and second lock mechanisms 127, 129, respectively. Once the entire refill 10A have been received in the refill receiving portion 114, the first and second engaging portions 54, 56 slightly lowered over the upper edges of the first and second lock mechanisms 127, 129 and then are locked on front edges of the first and second lock mechanisms 127, 129, respectively. Therefore, the refill 10A is locked in the cartridge 100.

If the refill 10A is inserted in the refill receiving portion 114, the first opening 32 of the refill 10A is fitted to the fourth protrusion portion 140 of the refill receiving portion 114 and the second opening 34 of the refill 10A is fitted to the fifth protrusion portion 142 of the refill receiving portion 114. Therefore, the refill 10A can be positioned at a correct position within the refill receiving portion 114.

If the connected staples S are reduced with the start of a binding process and thus the cover member 50 of the refill 10A lowers, the first and second engaging portion 54, 56 of the cover member 50 also lowers along front edges of the first and second lock mechanisms 127, 129. If all the connected staples S are discharged from the refill 10A and thus the cover member 50 lowers to the lowest position, the first and second engaging portions 54, 56 lower up to positions over the front edges of the first and second lock mechanisms 127, 129, so that the refill 10A is unlocked from the first and second lock mechanisms 127, 129. If the refill 10A is unlocked, the refill 10A can be withdrawn from the cartridge 100.

According to the present embodiment, when all the connected staples S are discharged from the refill 10A and thus the cover member 50 lowers to the lowest position, a height (position) of the top surface of the third protrusion portion 58 is set to be equal to or slightly higher than a height of a lower end edge 22*e*3 of the third opening 22*a* of the front wall 22 (see FIG. 4A). Since the height of the top surface of the third protrusion portion 58 when the cover member 50 is positioned at the lowest position is equal to or higher than that of the lower end edge 22*e*3 of the third opening 22*a*, it is possible to prevent the pressing member 170 from being caught on the lower end edge 22*e*3 of the third opening of the front wall 22 when the refill 10A is removed from the cartridge 100 (see FIG. 10B). Accordingly, the refill 10A can be smoothly withdrawn from the cartridge 100.

[First Example of Usage of Refill 10A]

Figure 13:
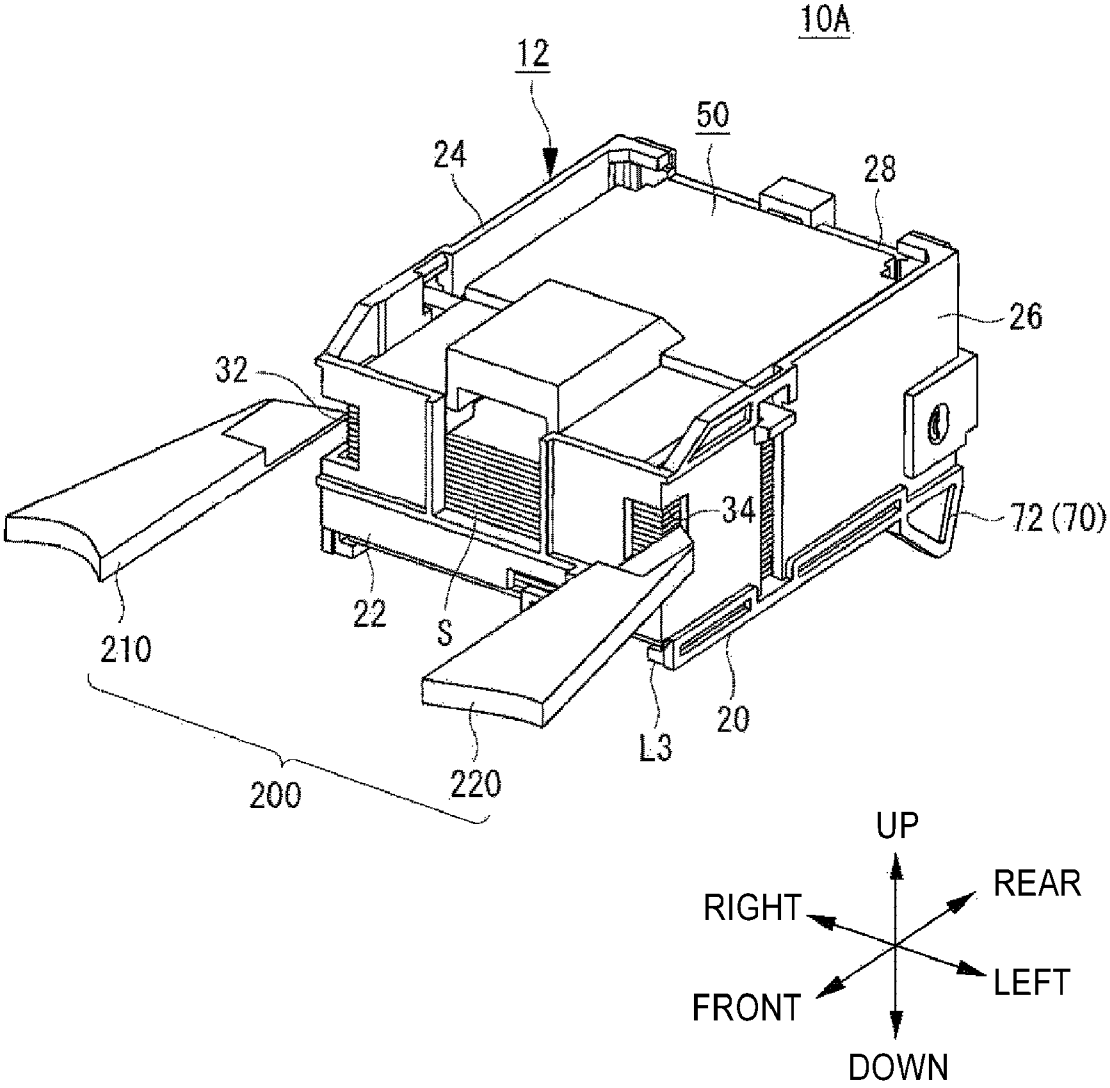
FIG. 13 is a view showing an example of measuring a dimension (length) of connected staples using first and second openings of the refill.

FIG. 13 is a view showing an example of measuring a dimension (length) of connected staples S using the first and second openings 32, 34 of the refill 10A. Specifically, an example is shown, in which the dimension of the connected staples S is measured using a commercially available general-purpose vernier caliper. As shown in FIG. 13, a length (width) of the connected staples can be measured by causing measuring parts 210, 220 of the vernier caliper to respectively abut against staple leg tip ends of the connected staples S exposed through the first and second openings 32, 34.

That is, the measuring parts 210, 220 can be caused to abut against (brought into contact with) the staple leg tip ends of the connected staples S through the first and second openings 32, 34. Various contact type sensors, not limited to the vernier caliper, can be used as the measuring instrument. Further, the measuring instrument is not limited to contact type measuring instruments, such as the vernier caliper. For example, a non-contact type measuring instrument may be employed, in which the dimension of the connected staples S can be measured by irradiating a laser beam on the connected staples S exposed through the first and second openings 32, 34. Alternatively, the dimension of the connected staples S may be measured by taking an image of the connected staples S exposed through the first and second openings 32, 34 and then performing an image processing.

[Second Example of Usage of Refill 10A]

Figure 14A:
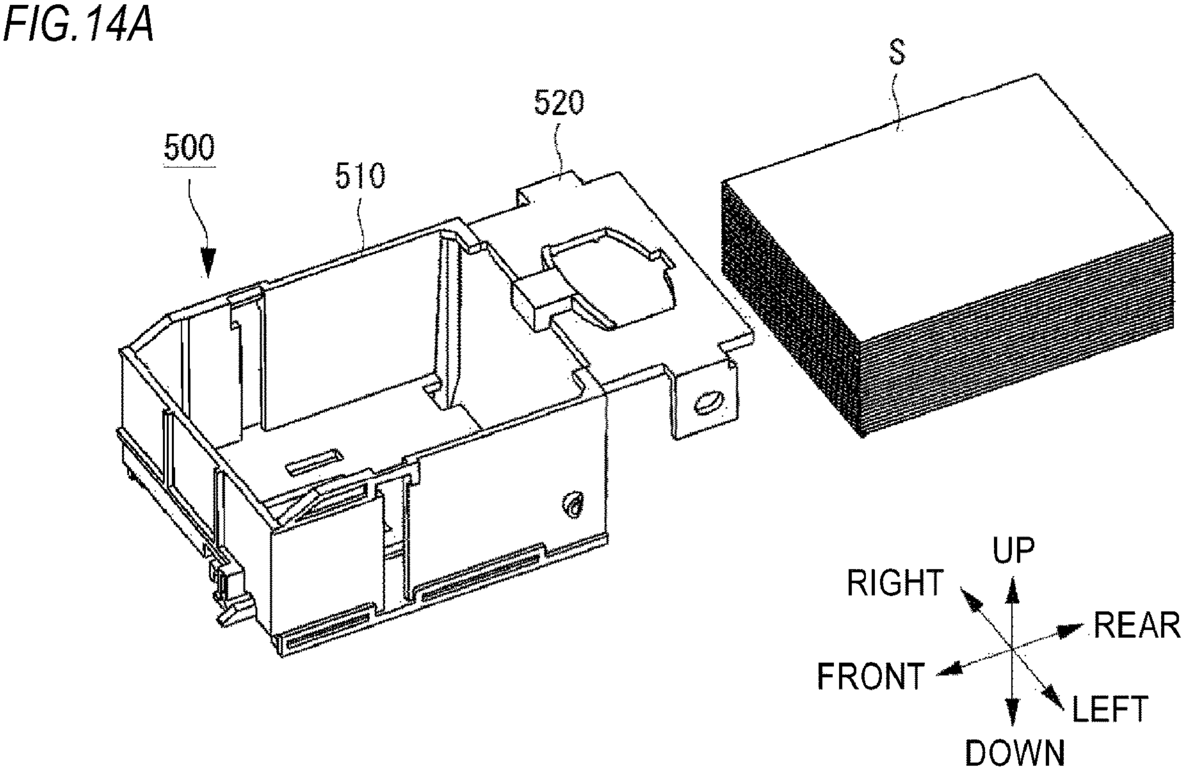
FIGS. 14A and 14B are views explaining a case where connected staples are inserted into a relate-art refill.
Figure 14B:
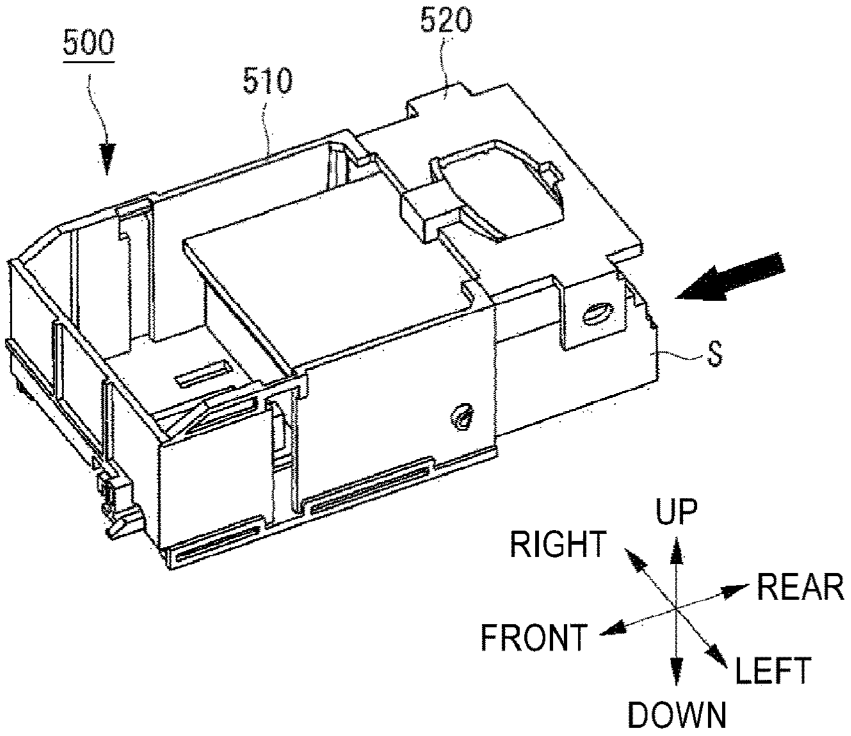
Figure 15A:
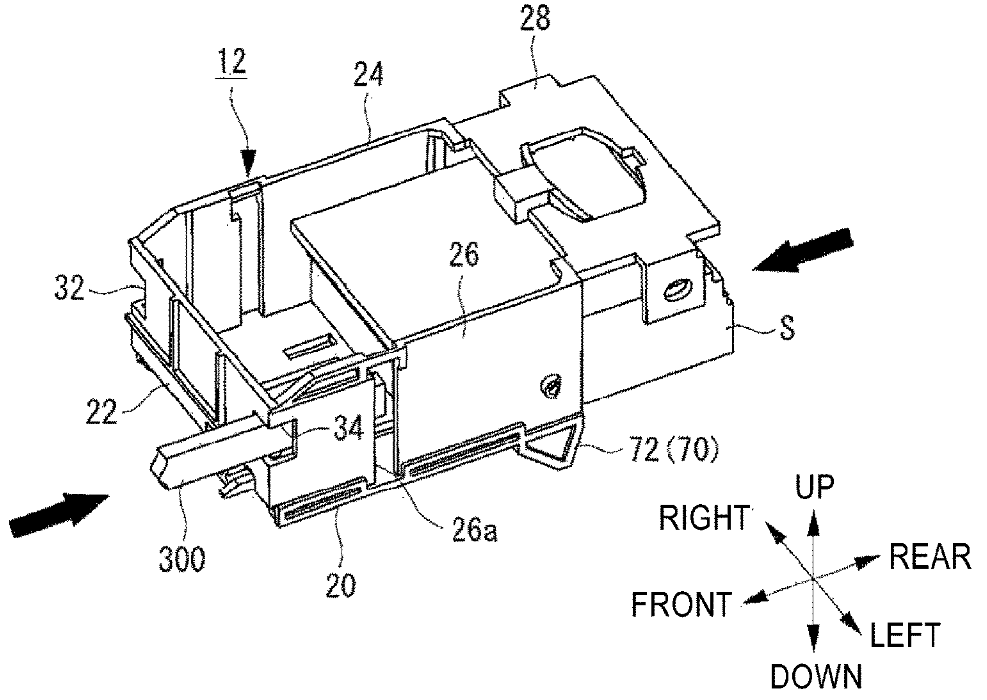
FIGS. 15A and 15B are views showing a state where connected staples are held by a jig to prevent the connected staples from collapsing when the connected staples are inserted into the refill.
Figure 15B:
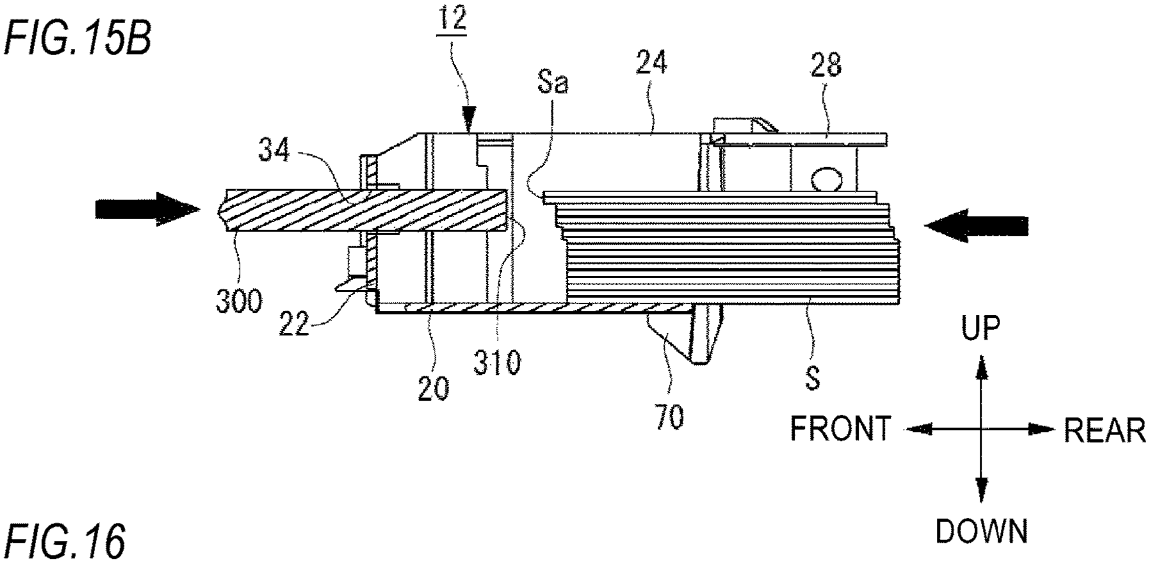
Figure 16:
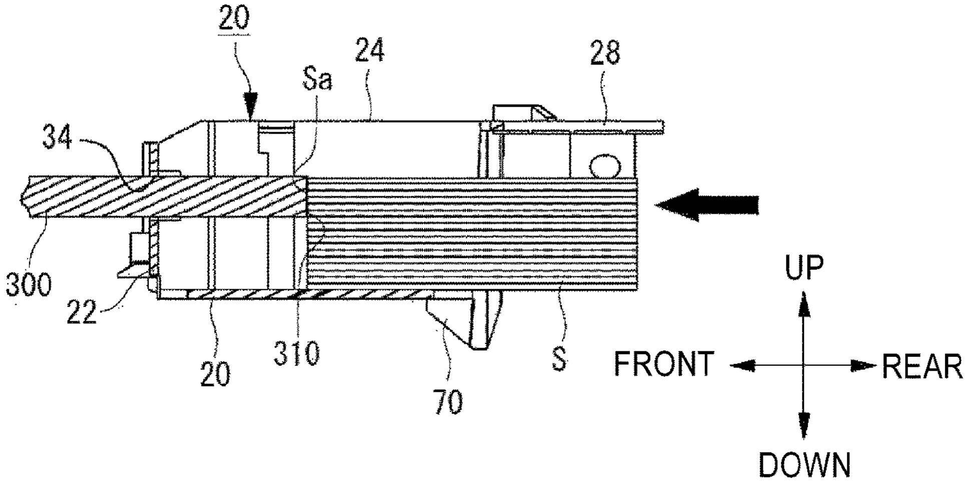
FIG. 16 is a view showing a state where connected staples are held by a jig to prevent the connected staples from collapsing when the connected staples are inserted into the refill.

FIGS. 14A and 14B are views explaining a case where connected staples are inserted into a refill. FIGS. 15A, 15B and 16 are views showing a state where connected staples are held by a jig to prevent the connected staples from collapsing when the connected staples are inserted into the refill.

First, situations when connected staples S are inserted into a related-art refill 500 will be described. In order to insert a stack of connected staples S into the refill 500, as shown in FIG. 14A, a rear wall 520 of a refill main body 510 is opened, and then the stack of connected staples S is inserted into the refill main body 510 from the rear of the refill main body 510. If insertion of the connected staples S into the refill main body 510 is completed, the rear wall 520 of the refill main body 510 is closed.

However, in the case where the stack of connected staples S is inserted into the refill main body 510, as shown in FIG. 14B, a stacked state of the stack of connected staples S might collapse within the refill main body 510. Specifically, the stack of connected staples S might collapse forward and the stack of connected staples S cannot be smoothly inserted into the refill main body 510.

According to the present embodiment, the refill 10A is provided with the first and second opening 32, 34. Accordingly, a jig 300 for supporting the connected staples S from the front side can be inserted through either or both of the openings 32, 34. That is, as shown in FIGS. 15A and 15B, a rod-shaped jig 300 is inserted into the refill main body 12 through the second opening 34 from the front side of the refill main body 12. Subsequently, as shown in FIG. 16, a distal end surface 310 of the jig 300 is pressed against a front face Sa of the stack of connected staples S, of which insertion into the refill main body 12 is started. Accordingly, the connected staples S can be inserted into the refill main body 12 while the front face Sa of the stack of connected staples S is supported. Therefore, it is possible to prevent the stacked state of the stack of connected staples S from collapsing, e.g., to prevent the stack of connected staples S from collapsing forward.

Meanwhile, although in the present embodiment, the jig 300 is inserted through the second opening 34, the present invention is not limited thereto, and the jig 300 may be inserted through the other first opening 32. Also, two jigs 300 may be prepared such that the jigs 30 are respectively inserted through the first opening 32 and the second opening 34, so as to prevent the stacked state of the connected staples S from collapsing during insertion of the connected staples S.

[Third Example of Usage of Refill 10A]

Figure 17:
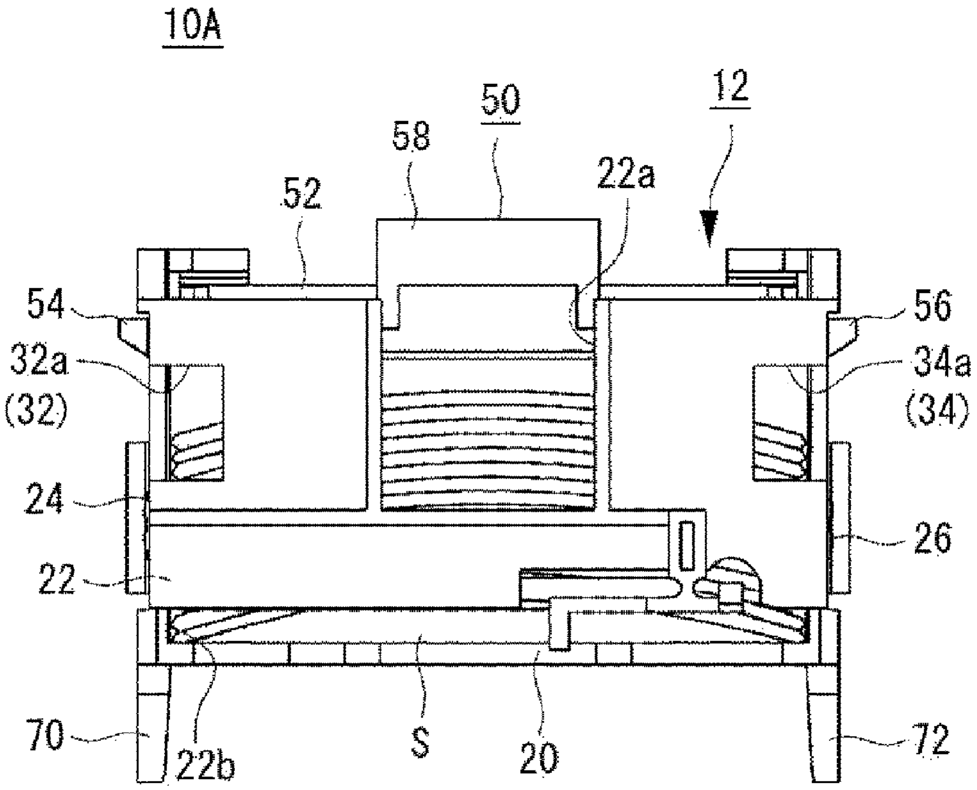
FIG. 17 is a view showing an example of checking deformation of connected staples, such as bending or warpage, using the first and second openings of the refill.
Figure 17:
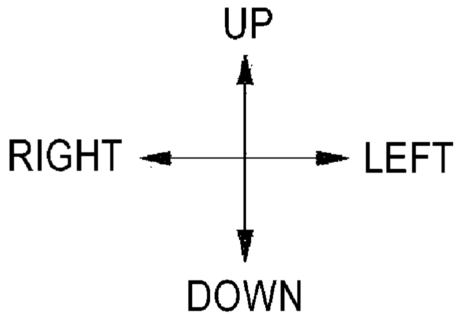

FIG. 17 is a view showing an example of checking deformation of connected staples S, such as bending or warpage, using the first and second openings 32, 34 of the refill 10A. As shown in FIG. 17, for example, in a case where connected staples S are bent in a curved state, ends of the connected staples S exposed through the first and second openings 32, 34 are inclined downward (or upward). Therefore, it is possible to check bending or the like of the connected staples S by checking a state of the connected staples S through the first and second openings 32, 34.

Since the third opening 22*a* is further provided in addition to the first and second openings 32, 34, both ends and the center of the connected staples S can be checked, which further facilitate checking of deformation of the connected staples S, such as bending or warpage.

As described above, according to the refill 10A of the present embodiment, the refill main body 12 is provided with the first opening 32 and the second opening 34, so that right and left staple leg tip ends of the connected staples S stacked and accommodated in the refill main body 12 can be exposed. Therefore, even after the connected staples S are accommodated in the refill main body 12, a state of the staple leg tip ends of the connected staples S can be checked through the first and second openings 32, 34. Also, the first and second openings 32, 34 are respectively formed to extend from the front wall 22 to the first and second side walls 24, 26, so as to extend across the first and second boundaries 32*c*, 34*c* of the refill main body 12. Accordingly, the measuring parts 210, 220 of the measuring instrument can be directly brought into contact with the staple leg tip ends of the connected staples S through the first and second openings 32, 34. Therefore, it is possible to measure a dimension of the connected staples S using a general-purpose measuring instrument, such as the vernier caliper 200.

[Exemplary Configuration of Refill 10B (Modified Example 1)]

Figure 18:
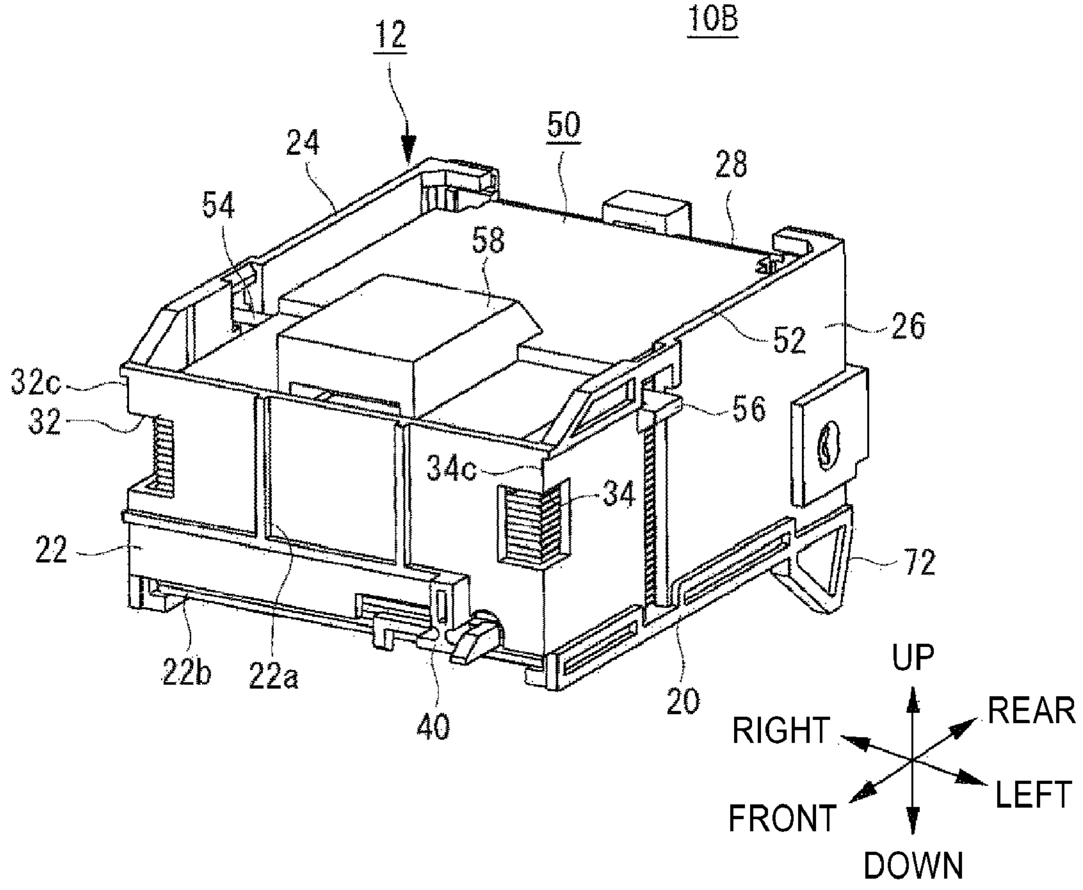
FIG. 18 is a perspective view showing another exemplary configuration of a refill (modified example 1)

FIG. 18 shows an example of a configuration of a refill 10B according to a modified example of the present invention. In the following, components common to the refill 10A as described above are designated by the same reference numerals, and the descriptions thereof will be simplified or omitted. As shown in FIG. 18, a refill main body 12 of the refill 10B includes first and second openings 32, 34 respectively formed on a first boundary 32*c* which is a connection part between a front wall 22 and a first side wall 24, and a second boundary 34*c* which is a connection part between the front wall 22 and a second side wall 26. However, unlike the above-described embodiment, an opening corresponding to the third opening 22*a* is not provided between the first opening 32 and the second opening 34.

According to the refill 10B, right and left staple leg tip ends of the connected staples S can be exposed through the first opening 32 and the second opening 34, even if an opening corresponding to the third opening 22*a* is not provided. Accordingly, the staple leg tip ends of the connected staples S can be checked or a dimension of the connected staples S can be measured using a measuring instrument.

[Exemplary Configuration of Refill 10C (Modified Example 2)]

Figure 19:
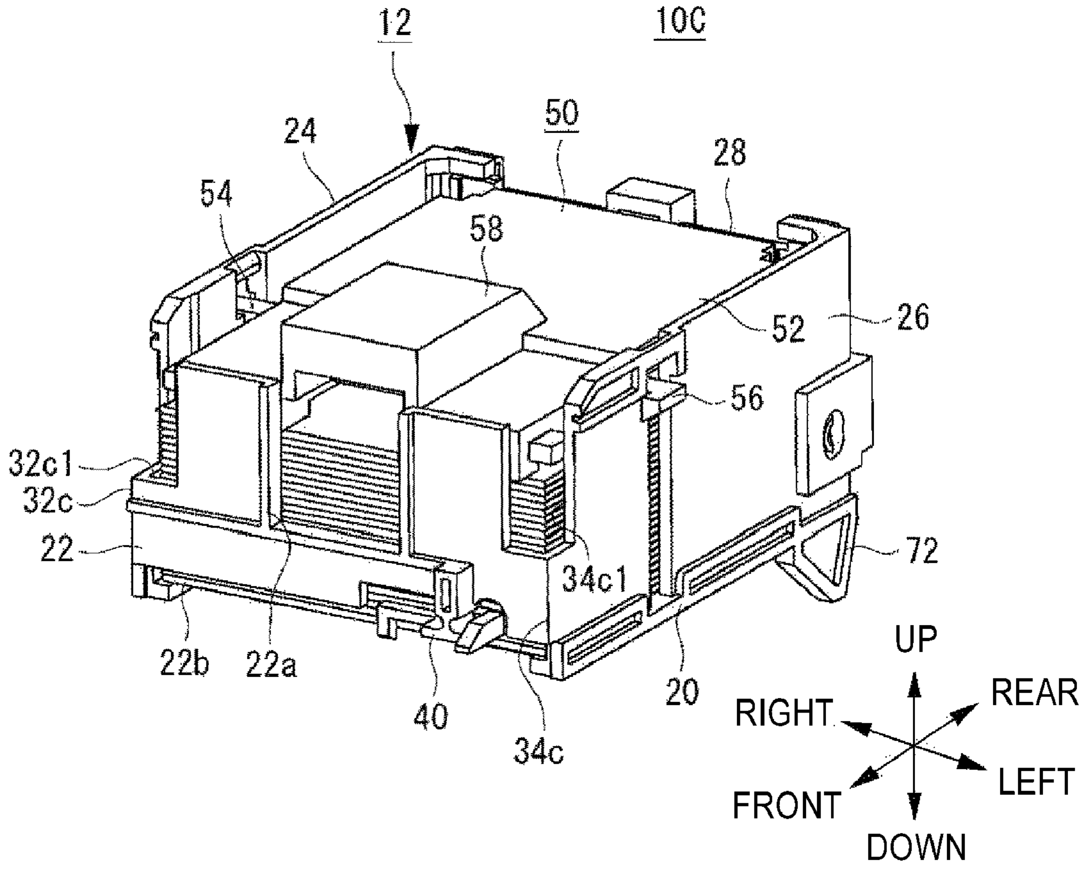
FIG. 19 is a perspective view showing another exemplary configuration of a refill (modified example 2)

FIG. 19 shows an example of a configuration of a refill 10C according to a modified example of the present invention. In the following, components common to the refill 10A as described above are designated by the same reference numerals, and the descriptions thereof will be simplified or omitted. As shown in FIG. 19, a refill main body 12 of the refill 10C includes first and second openings 32*c*1, 34*c*1 respectively formed on a first boundary 32*c* which is a connection part between a front wall 22 and a first side wall 24, and a second boundary 34*c* which is a connection part between the front wall 22 and a second side wall 26. However, unlike the first and second openings 32, 34 according to the above-described embodiment and the modified example 1, the first and second openings 32*c*1, 34*c*1 are cut out to extend from the substantially center portion of the first and second boundaries 32*c*, 34*c* to upper edge portions thereof in the upper-lower direction, and thus are configured to be opened upward.

Since the first and second openings 32*c*1, 34*c*1 of the refill 10C are opened upward, an opening area in the stacking direction of the connected staples S can be increased. Therefore, measurement using a measuring instrument, such as the vernier caliper 200, can be facilitated. Further, since a range, over which the connected staples S are visible, is increased, deformation and the like of the connected staples S can be more accurately checked.

[Exemplary Configuration of Refill 10D (Modified Example 3)]

Figure 20:
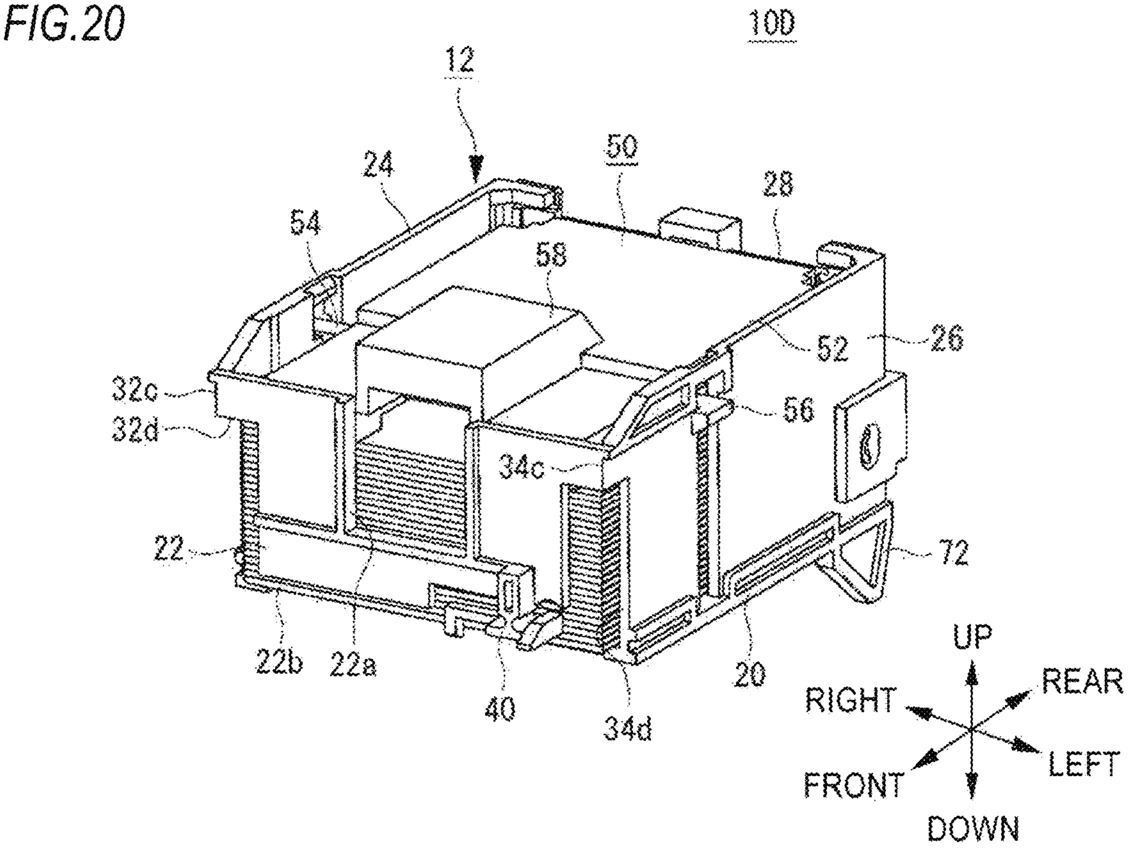
FIG. 20 is a perspective view showing another exemplary configuration of a refill (modified example 3)

FIG. 20 shows an example of a configuration of a refill 10D according to a modified example of the present invention. In the following, components common to the refill 10A as described above are designated by the same reference numerals, and the descriptions thereof will be simplified or omitted. As shown in FIG. 20, a refill main body 12 of the refill 10D includes first and second openings 32*d*, 34*d* respectively formed on a first boundary 32*c* which is a connection part between a front wall 22 and a first side wall 24, and a second boundary 34*c* which is a connection part between the front wall 22 and a second side wall 26. The first and second openings 32*d*, 34*d* are cut out to extend from upper edges of openings in the first and second boundaries 32*c*, 34*c* to the lowest ends of the first and second boundaries 32*c*, 34*c*, and thus are configured to be opened downward.

Since the first and second openings 32*d*, 34*d* of the refill 10D are opened downward, an opening area in the stacking direction of the connected staples S can be increased. Therefore, measurement using a measuring instrument, such as the vernier caliper 200, can be facilitated. Further, since a range, over which the connected staples S are visible, is increased, deformation and the like of the connected staples S can be more accurately checked.

[Exemplary Configuration of Refill 10E (Modified Example 4)]

Figure 21:
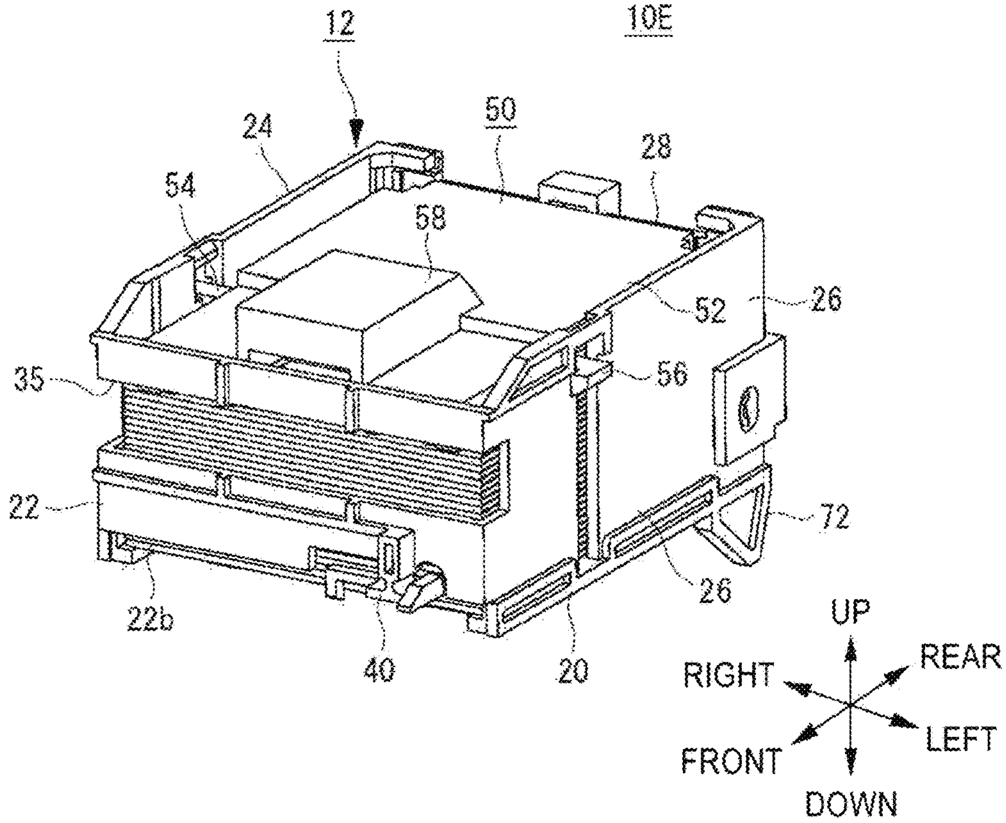
FIG. 21 is a perspective view showing another exemplary configuration of a refill (modified example 4)

FIG. 21 shows an example of a configuration of a refill 10E according to a modified example of the present invention. In the following, components common to the refill 10A as described above are designated by the same reference numerals, and the descriptions thereof will be simplified or omitted. As shown in FIG. 21, a refill main body 12 of the refill 10E includes an opening 35 formed to continuously extend over a first side wall 24, a front wall 22 and a second side wall 26. That is, the opening 35 is configured as one opening formed by connecting (communicating) the first opening 32, the second opening 34 and the third opening 22*a* of the above refill 10A with each other in the right-left direction.

According to the refill 10E, an opening area in a width direction of the connected staples S can be increased. Accordingly, inspection of bending or warpage of the connected staples S can be more accurately performed.

[Exemplary Configuration of Refill 10F (Modified Example 5)]

Figure 22A:
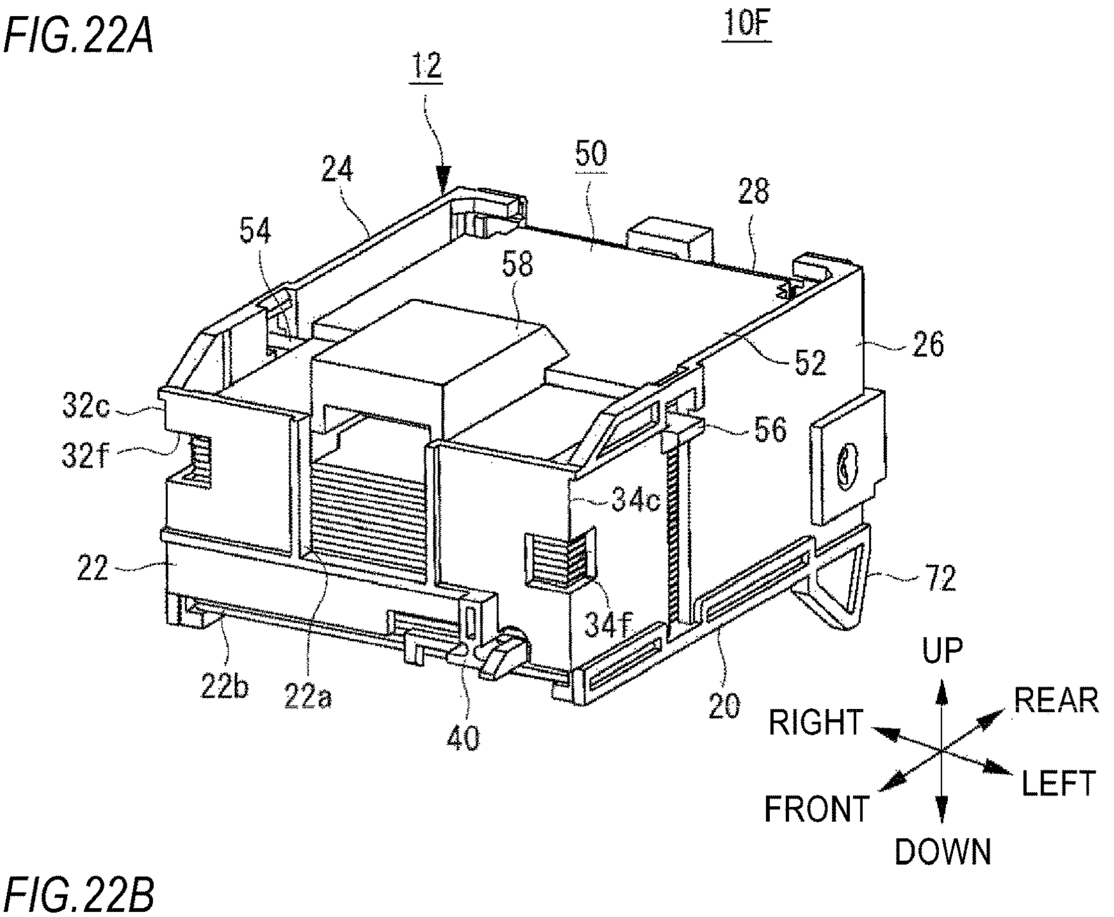
FIG. 22A is a perspective view showing another exemplary configuration of a refill (modified example 5)
Figure 22B:
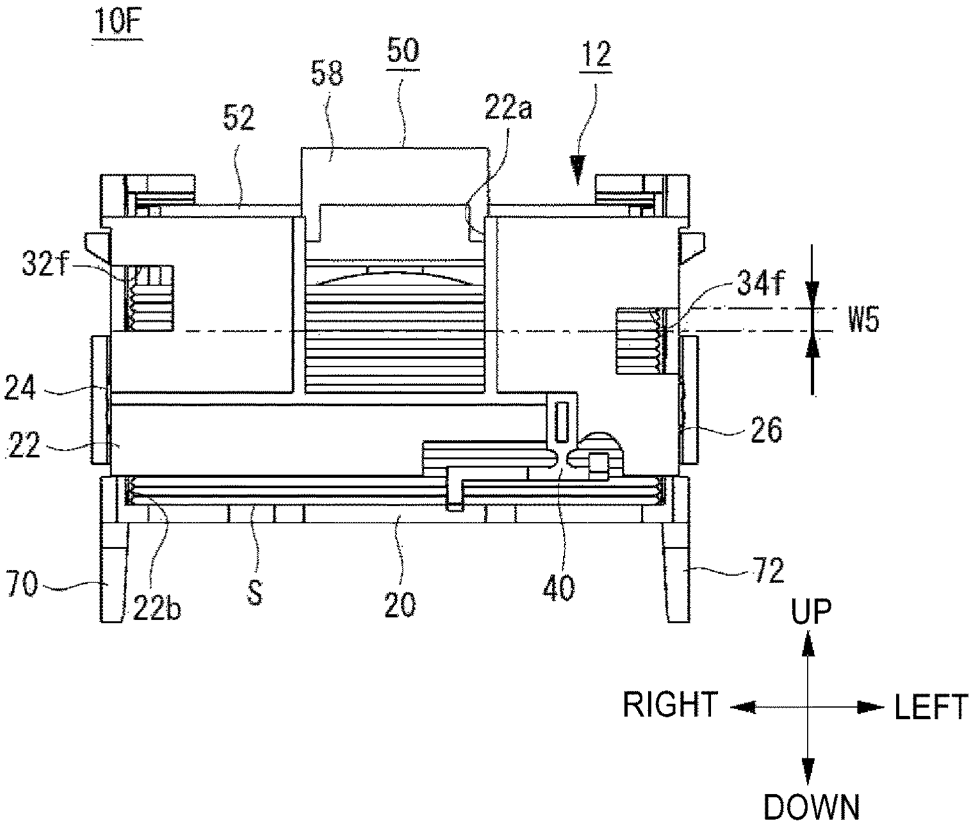
FIG. 22B is a front view thereof.

FIGS. 22A and 22B show an example of a configuration of a refill 10F according to a modified example of the present invention. In the following, components common to the refill 10A as described above are designated by the same reference numerals, and the descriptions thereof will be simplified or omitted. As shown in FIGS. 22A and 22B, a refill main body 12 of the refill 10F includes a first opening 32*f* formed on a first boundary 32*c* which is a connection part between a front wall 22 and a first side wall 24, and a second opening 34*f* formed on a second boundary 34*c* which is a connection part between the front wall 22 and a second side wall 26.

As shown in FIG. 22B, the first opening 32*f* and the second opening 34*f* are formed to at least partially overlap each other by a width W5 in the upper-lower direction of the front wall 22. The overlapping width W5 is a thickness corresponding to at least two connected staples S. By having the overlapping width W5 corresponding to at least two sheets of connected staples S, the measuring parts 210, 220 of the vernier caliper 200 can be pressed against the connected staples S.

[Exemplary Configuration of Refill 10G (Modified Example 6)]

Figure 23:
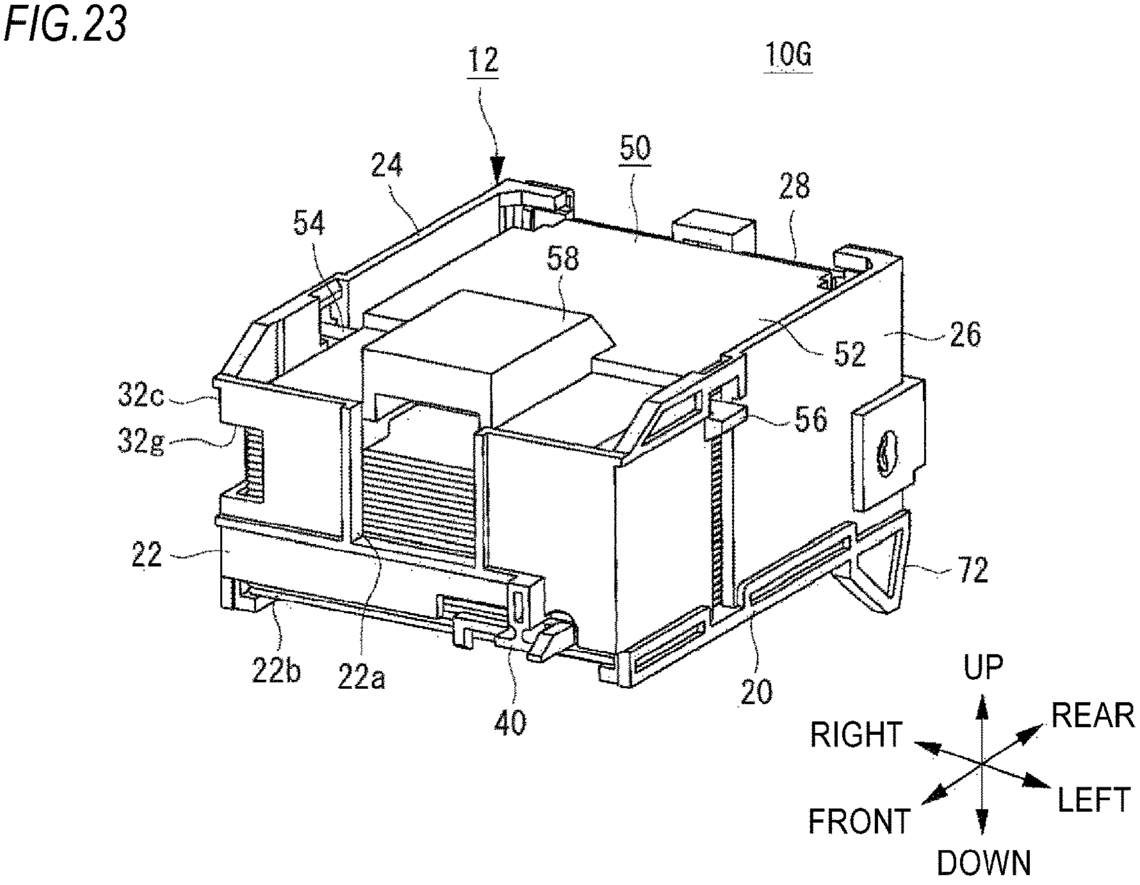
FIG. 23 is a perspective view showing another exemplary configuration of a refill (modified example 6)

FIG. 23 shows an example of a configuration of a refill 10G according to a modified example of the present invention. In the following, components common to the refill 10A as described above are designated by the same reference numerals, and the descriptions thereof will be simplified or omitted. As shown in FIG. 23, a refill main body 12 of the refill 10G includes a first opening 32*g* formed on a first boundary 32*c* which is a connection part between a front wall 22 and a first side wall 24. In the refill 10G, an opening is provided not on both end portions of the front wall 22 of the refill main body 12 in the right-left direction, but on only one boundary (first boundary 32*c*) thereof.

Even in this case, a dimension of the connected staples S can be measured, for example, by pressing the stack of connected staples S against an inner surface of a second side wall 26, on which no opening is formed, and then pressing the measuring part 210 of the vernier caliper 200 against a staple leg tip end of the connected staples S exposed through the first opening 32*g*. Specifically, an actual width of the connected staples S can be calculated by reducing a thickness of the second side wall 26, which is previously measured, from the measured value.

[Exemplary Configuration of Refill 10H (Modified Example 7)]

Figure 24:
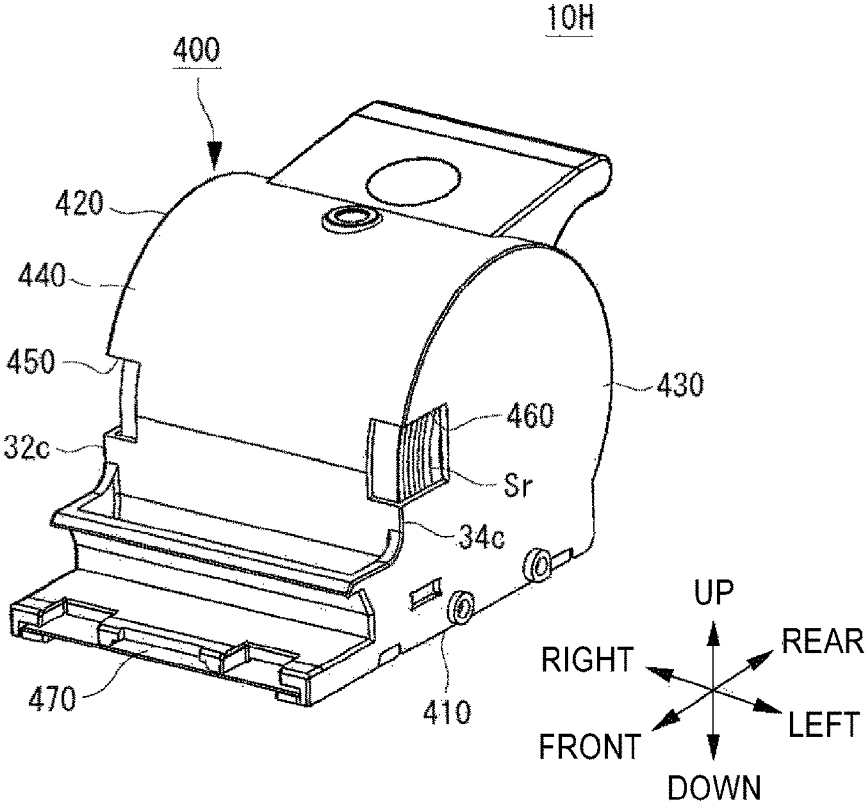
FIG. 24 is a perspective view showing another exemplary configuration of a refill (modified example 7)

FIG. 24 shows an example of a configuration of a refill 10H according to a modified example of the present invention. In the following, descriptions of components common to the refill 10A as described above will be simplified or omitted.

As a refill, the refill 10H can be employed which accommodates a connected staple Sr obtained by winding an elongated sheet-shaped connected staple into a roll shape, as well as the above-described refill 10A and the like which accommodate stacked sheet-shaped connected staples S. As shown in FIG. 24, a staple accommodating portion 400 of the refill 10H includes a generally rectangular bottom wall 410, a first generally circular side wall 420 standing from one side of the bottom wall 410 in the right-left direction, a second generally circular side wall 430 opposing the first side wall 420 and standing from the other side of the bottom wall 410 in the right-left direction, and a wall 440 standing from one front side of the bottom wall 410 and formed in a circular arc shape to extend along a peripheral edge of each of the first side wall 420 and the second side wall 430. A front face side of the wall 440 serves as a front wall.

First and second openings 450, 460 for respectively exposing one staple leg tip end and the other staple leg tip end of the connected staple Sr are respectively formed on a first boundary 32*c* which is a connection part between the front face side of the wall 440 and the first side wall 420, and a second boundary 34*c* which is a connection part between the front face side of the wall 440 and the second side wall 430. In addition, on a lower front end portion of the staple accommodating portion 400, a discharging port 470 is formed for discharging the connected staple Sr. Thus, according to the refill 10H, staple leg tip ends of the connected staple Sr can be exposed through the first and second openings 450, 460. Accordingly, even after the connected staple Sr is accommodated in the refill 10H, a dimension and the like of the connected staple Sr can be measured.

[Exemplary Configuration of Refill 10I (Modified Example 8)]

Figure 25:
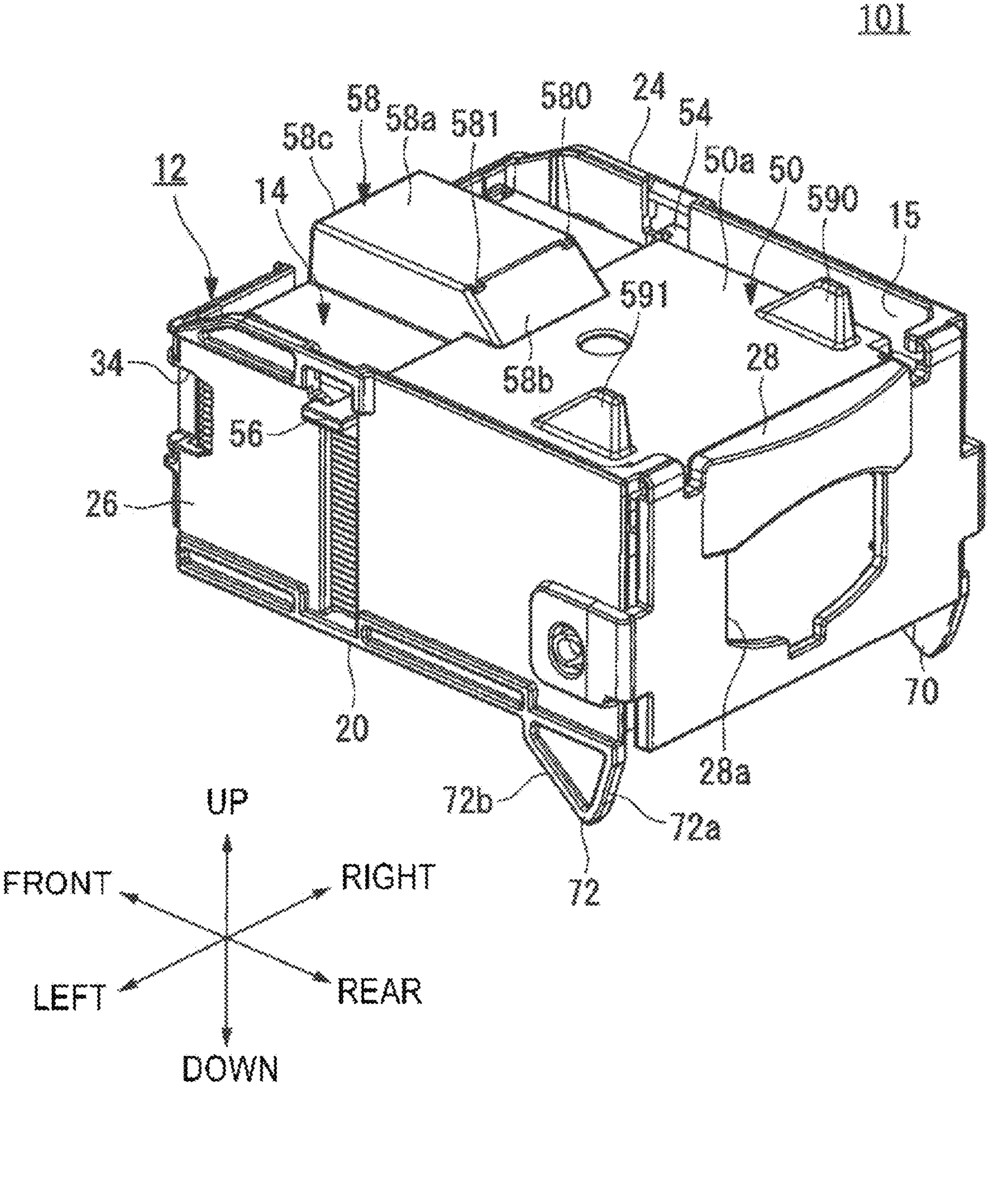
FIG. 25 is a perspective view showing further another exemplary configuration of a refill (modified example 8)
Figure 26:
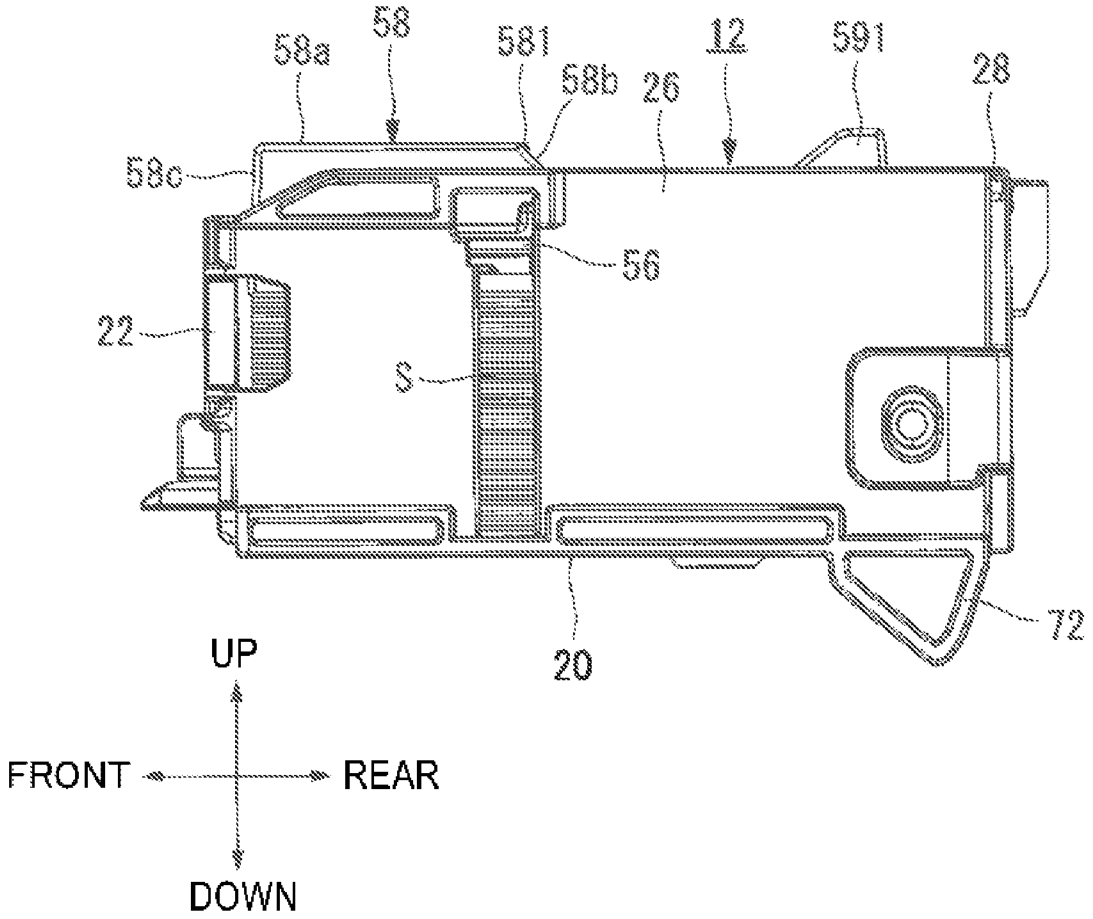
FIG. 26 is a side view of the refill according to the modified example 8.
Figure 27:
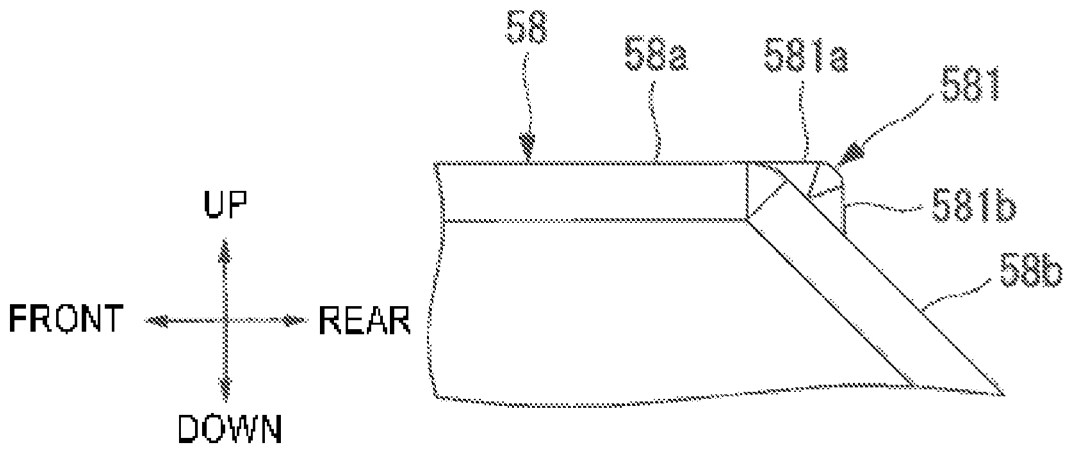
FIG. 27 is an enlarged view of a main part of an engaging portion.

FIGS. 25 to 27 show an example of a configuration of a refill 10I according to the present invention, in which FIG. 25 is a perspective of the refill 10I as viewed obliquely from the rear side thereof, FIG. 26 is an enlarged view of the refill 10I, and FIG. 27 is an enlarged view of a main part of an engaging portion 581. Meanwhile, in the following, descriptions of components common to the refill 10A as described above will be simplified or omitted.

As shown in FIGS. 25 to 27, the refill 10I has a third protrusion portion 58 of a cover member 50, which is different in shape from those of the refill 10A and the like, and also has a pair of sixth protrusion portions 590, 591, which are not provided on the refill 10A and the like, on a rear part of the upper surface of the cover member 50.

The third protrusion portion 58 protrudes in a generally rectangular parallelepiped shape from the upper surface of the cover member 50 and has a top surface 58*a* and an inclined surface 58*b* connecting the top surface 58*a* with the upper surface of the cover member 50. A pair of engaging portions 580, 581 protrude from the inclined surface 58*b*. The pair of engaging portions 580, 581 are provided on an end portion of the inclined surface 58*b*, which is close to the top surface 58*a*, and is configured to have a generally triangle shape as shown in FIG. 27, when viewing the refill 10I in the right and left direction (i.e., in a side view). The engaging piece 581 includes a flat surface 581*a* extending from the top surface 58*a*, and engaging surface 581*b* extending from a rear end of the flat surface 581*a* toward the inclined surface 58*b*. The engaging portion 580 also has a shape similar to that of the engaging portion 581.

Figure 28:
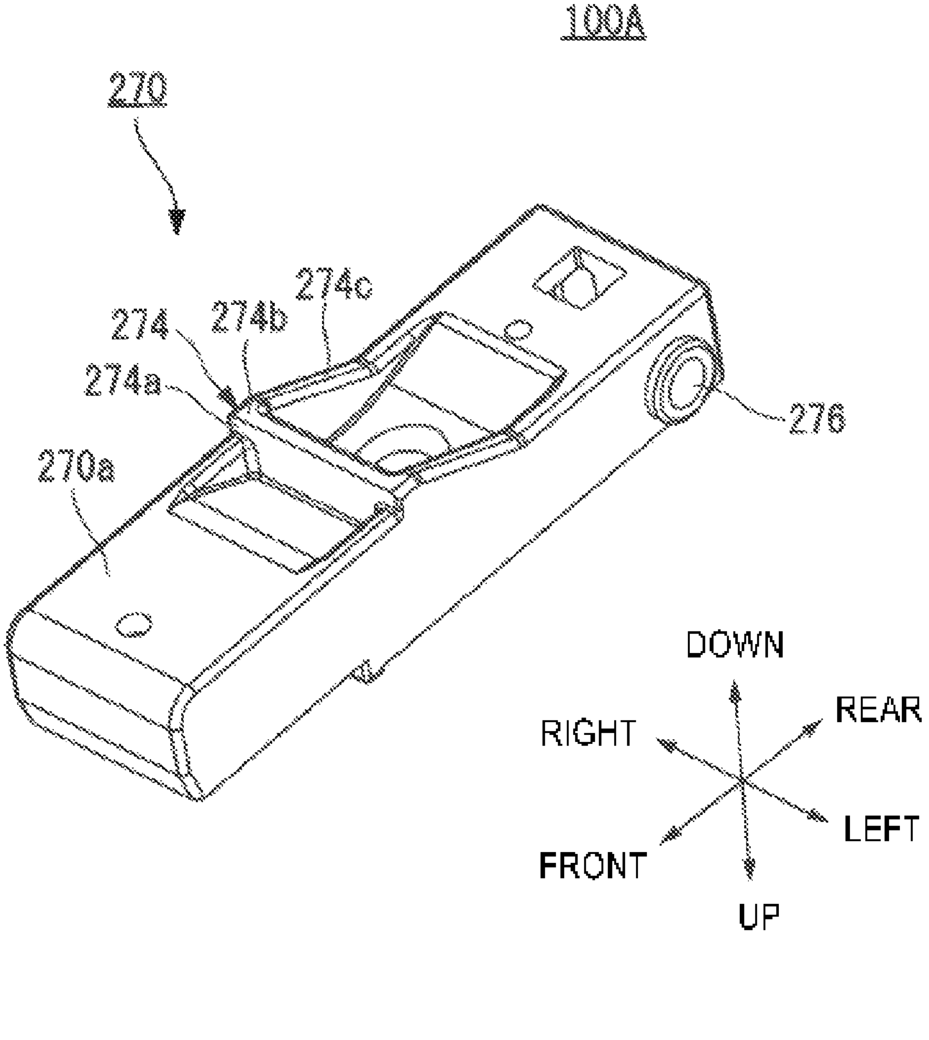
FIG. 28 is a perspective view of a pressing member of a cartridge according to the modified example 8.

FIG. 28 is a perspective view of a pressing member 270 of the cartridge 100A as viewed from a lower surface side thereof.

The pressing member 270 is a generally rectangular parallelepiped member provided to protrude from the top wall 128 of the refill receiving portion 114, and one end side thereof is pivotally attached on a rear part side of the top wall 128 of the refill receiving portion 114 via a shaft portion 276. The other end side of the pressing member 270 extends obliquely downward toward the end wall 122. In the present modified example, a holding portion 274 is provided on a lower surface 270*a* of the pressing member 27.

The holding portion 274 is provided at the substantially middle portion of the lower surface 270*a* of the pressing member 270 in a longitudinal direction thereof. The holding portion 274 protrudes from the lower surface 270*a* toward the bottom wall 120 in a step shape, i.e., in a crank shape. The holding portion 274 has an abutting surface 274*a* extending from the lower surface 270*a* in a downward direction (a direction toward the bottom wall 120), a top surface portion 274*b* contiguous to the abutting surface 274*a*, and an inclined portion 274*c* inclined rearward from the top surface portion 274*b*.

As the refill 10A is advanced into the refill receiving portion 114, the pressing member 270 enters through the third opening 22*a* of the front wall 22 and then rides on the third protrusion portion 58 of the cover member 50. Since the pressing member 270 is urged downward by an elastic member, the pressing member 270 presses the cover member 50 when the pressing member 270 is riding on the third protrusion 50 and also thereafter.

When the refill 10I is inserted into the refill receiving portion 114, the first and second engaging portions 54, 56 of the cover member 50 move along upper edges of the first and second lock mechanisms 127, 129, respectively. Once the entire refill 10I have been received in the refill receiving portion 114, the first and second engaging portions 54, 56 slightly descend over the upper edges of the first and second lock mechanisms 127, 129 and then are locked on front edges of the first and second lock mechanisms 127, 129, respectively. Therefore, the refill 10I is locked in the cartridge 100. However, if a certain impact is exerted on the cartridge 100 with the refill 10A or the like rather than the refill 10I loaded thereto, such as by erroneously dropping the cartridge 100, the cover member 50 is likely to push up the pressing member 270 due to the impact, thereby causing the refill to be unlocked. If the refill is unlocked, the refill 10A and the like is likely to fall off from the refill receiving portion 114. Therefore, in order to prevent the refill 10I from falling off from the refill receiving portion 114 even if the cover member 50, more specifically the third protrusion portion 58 pushes up the pressing member 270, the engaging portions 580, 581 of the third protrusion portion 58 are configured to be engaged with the holding portion 274 of the pressing member 270.

Figure 29A:
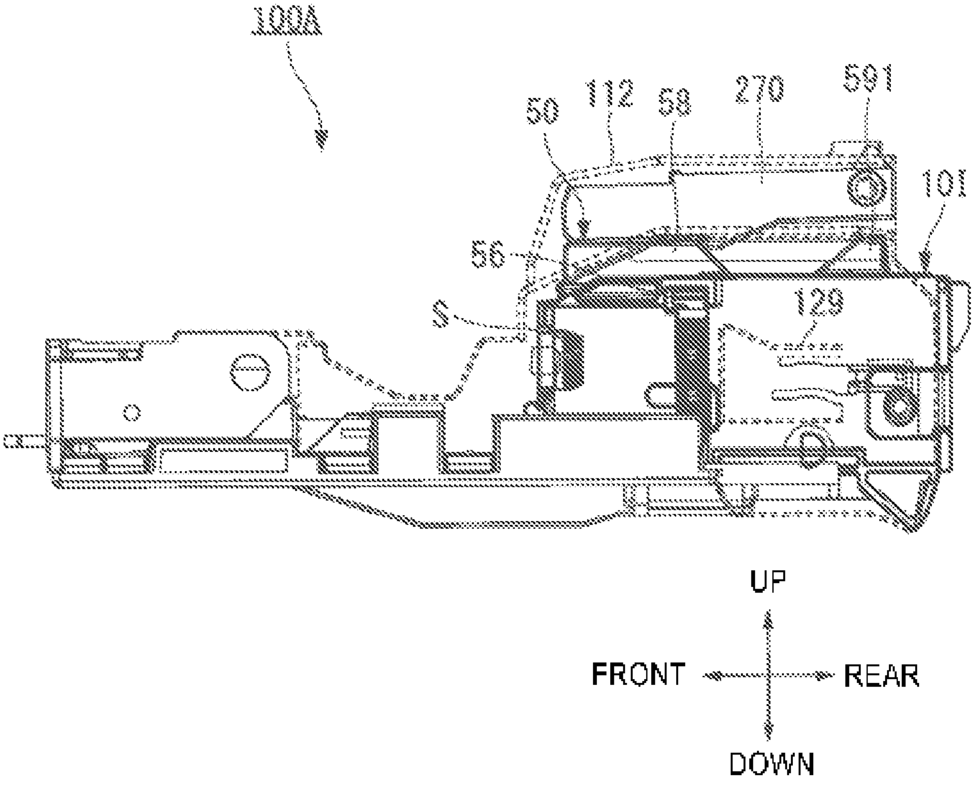
FIGS. 29A and 29B are views showing a state where the refill according to the modified example 8 is loaded to the cartridge.
Figure 29B:
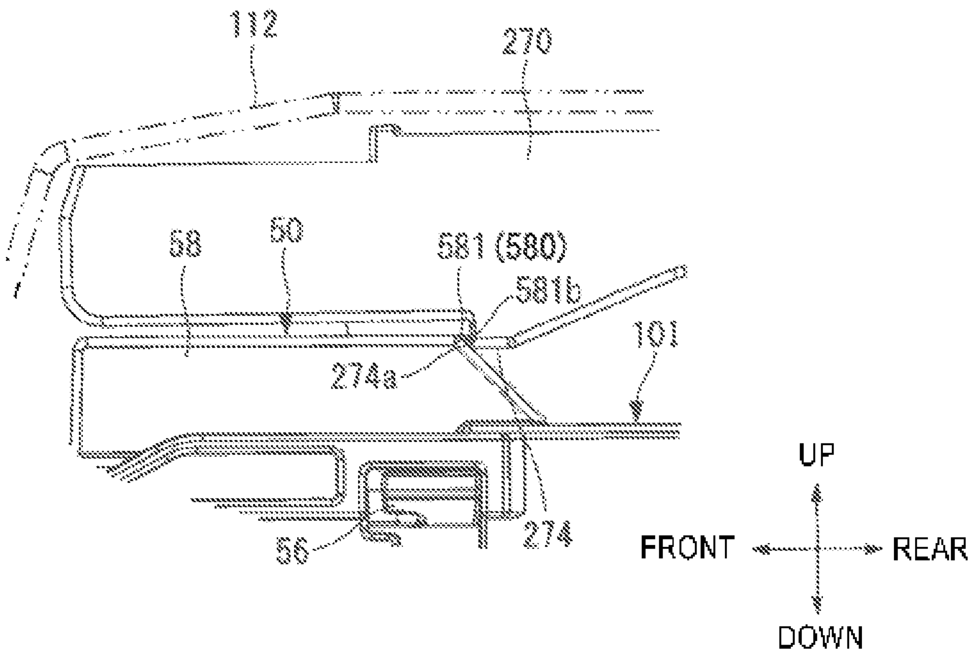

Now, engagement between the engaging portions 580, 581 and the holding portion 274 will be described in detail. As shown in FIG. 29, if the third protrusion portion 58 is pushed up, the engaging surfaces 581*b* (580*b*) of the engaging portions 581 (580) are positioned to oppose the abutting surface 274*a* of the holding portion 274. Therefore, even if a force causing the refill 10I to fall out of the refill receiving portion 114 is exerted on the refill 10I, the refill 10I does not fall out of the refill receiving portion 114 due to the engaging surfaces 581*b* abutting against the abutting surface 274*a*. In addition, since the inclined portion 274*c* is provided on the holding portion 274, the refill 10 can be smoothly inserted into the refill receiving portion 114 without being caught on the pressing member 270.

Although, in the present modified example, the engaging portions 580, 581 are provided at two locations including both end portions, in the right and left direction, of the third protrusion portion 58, the engaging portion may be provided at only one location or at three or more locations. Also, the engaging portions 580, 581 may be configured as a single member having a predetermined length in the right and left direction of the third protrusion portion 58. That is, the shape of the engaging portions 580, 581 is sufficient if the shape can be engaged with the holding portion 274 of the pressing member 270.

As shown in FIG. 25, the sixth protrusion portions 590, 591 protrude upward the rear part of the upper surface of the cover member 50, and in the present modified example, are provided to have a predetermined space therebetween in the right and left direction of the cover member 50. More specifically, the sixth protrusion portion 590 is provided on a right end side of the upper surface portion of the cover member 50 close to the first side wall 24, and the sixth protrusion portion 591 is provided on a left end side of the upper surface portion of the cover member 50 close to the second side wall 26.

The sixth protrusion portions 590, 591, which are a plate-shaped member having a predetermined thickness, are configured such that a shape thereof as viewed in the right and left direction (in a side view) is a generally right-angled trapezoid shape and an acute-angle side of the generally right-angled trapezoid shape is arranged to face forward. As shown in FIG. 26, a height of the sixth protrusion portions 590, 591 is set in such a manner that top portions thereof protrude upward above at least wall portions (upper edge portions) of the first side wall 24 and the second side wall 26.

Since the sixth protrusion portions 590, 591 are provided on the rear part of the upper surface of the cover member 50 and also the height of the sixth protrusion portions 590, 591 is set to be higher than a height of the wall portions of the first and second side walls 24, 26, a possibility that the sixth protrusion portions 590, 591 are earlier subjected to an impact than the side walls 24, 26 or the rear wall 28 is increased, for example, even if the refill 10I drops on a floor with the cover member 50 down. Therefore, it is possible to mitigate an impact on the side walls 24, 26 or the rear wall 28. Particularly, since the connected staples S are stored on the refill 10I in the stacked state, when the refill 10I drops, the impact due to the mass of the connected staples S is received by the fitting portion between the cover member 50 and the rear wall 28 and the hinge portions 29*a* and 29*b* of the rear wall 28. However, since the sixth protrusion portions 590 and 591 are provided, it is possible to mitigate these impacts. Further, for the same reason, the side walls 24, 26 or the rear wall 28 can be protected from an impact caused during transportation or the like.

Also, even if the cartridge 100A with the refill 10I mounted therein is dropped, the sixth protrusion portions 590, 591 bump on the top wall 128 (see FIG. 9*b* or the like) inside the refill receiving portion 114, thereby mitigating an impact on the other parts of the refill 10I, in particular on the rear wall 28 configured as a hinge. Therefore, it is possible to prevent the rear wall 28 or the like of the refill 10I from being damaged. Similarly, it is possible to avoid a problem that the rear part of the refill 10I is lifted up when the cartridge 100A is subjected to an impact, thereby also preventing the refill 10I from falling out of the cartridge 100A.

The shape of the sixth protrusion portion 590, 591 is not limited to the generally right-angled trapezoid shape as in the present modified example. Since it is sufficient if an impact upon dropping of the refill 10I or the like can be absorbed by the sixth protrusion portions 590, 591, the shape may be, for example, a cylindrical shape, a prismatic shape, an L shape in a plan view, a cross shape in a plan view or the like. Also, although two sixth protrusion portions 590, 591 are incorporated in the present modified example, one, three or more sixth protrusion portions may be incorporated. Further, a single sixth protrusion portion having a predetermined length in the right and left direction of the cover member 50 may be incorporated. Further, the sixth protrusion portions 590, 591 may be integrally formed with the cover member 50 or may be configured as separate members. However, by providing a pair of right and left sixth protrusion portions 590, 591 as in the present modified example, the following effects can be expected.

As shown in FIG. 25, a hole 28*a* is formed in the rear wall 28 of the refill 10I to such an extent that a finger of a user can be inserted therein. Accordingly, when withdrawing the refill 10I from the cartridge 100A, the user can advantageously insert a finger into the hole 28*a* to withdraw the refill 10I. When the refill 10I is withdrawn from the cartridge 100A, the connected staples S have typically all been spent, and thus the cover member 50 is positioned at the lowest position in the staple receiving portion 14. Accordingly if the sixth protrusion portions 590, 591 are configured as a single sixth protrusion portion having a predetermined length in the right and left direction of the cover member 50, the sixth protrusion portions 590, 591 obstruct insertion of the finger when the finger is inserted into the hole 28*a*. However, if the sixth protrusion portions 590, 591 are arranged on both right and left end sides as in the present modified example, the sixth protrusion portions 590, 59 do not obstruct insertion of the finger.

Meanwhile, although the present invention has been described with reference to the foregoing embodiments, the technical scope of the invention is not limited to the scope as described in the foregoing embodiments. Various modifications or improvements may be added to the foregoing embodiments without departing from the spirit of the invention.

Meanwhile, some or all of the foregoing embodiments can be described as in the following supplements.

[First Protrusion Portion 70 and Second Protrusion Portion 72]

(Supplement 1-1)

The refill 10A and the like include a staple receiving portion 14, the staple receiving portion 14 including:

a bottom wall 20 configured to allow a stack of connected staples to be placed thereon; and a rear wall 28 erected from the bottom wall 20, wherein the bottom wall 20 has protrusion portions (first protrusion portion and second protrusion portion) 70, 72 protruding downward from a rear part of a lower surface (of the bottom wall 20) adjacent to the rear wall 28.

(Supplement 1-2)

In the refill 10A and the like as set forth in the above Supplement 1-1, the protrusion portions 70, 72 are arranged on both end sides of the lower surface of the bottom wall 20 in a right and left direction thereof (Supplement 1-3)

In the refill 10A and the like as set forth in the above Supplement 1-1 configured to be loadable through an opening 130 of a stapler 301, the stapler 301 including:

a cartridge 100 having the opening 130 having a rectangular shape and having a bottom side (long side) 130*a* partially cut out; and a stapler main body 501 configured to allow the cartridge 100 to be loaded therein and having a locking shaft 504, wherein when the cartridge 100 has been loaded therein, the locking shaft 504 is positioned below the opening 130 to extend along the bottom side 130*a* of the opening 130 and can move in directions approaching and separating from the opening 130, wherein when the refill 10A and the like are loaded through the opening 130, the protrusion portions 70, 72 are fitted into notches 114*a*, 114*b* of the bottom side 130*a*, wherein the protrusion portions 70, 72 also have rear surface portions 70*a*, 72*a*, wherein when the locking shaft 504 have moved in the direction approaching the opening 130 while the protrusion portions 70, 72 have been fitted in the notches 114*a*, 114*b*, the rear surface portions 70*a*, 72*a* abut against the locking shaft 504.

(Supplement 1-4)

In the cartridge 100 as set forth in the above Supplement 1-3, the notches 114*a*, 114*b* are provided on both end sides of the bottom side 130*a*.

(Supplement 1-5)

The locking shaft 504 as set forth in the above Supplement 1-3 is urged in the direction approaching the opening 130 by an elastic member, and in the refill 10A or the like as set forth in the above Supplement 1-3, the protrusion portions 70, 72 include inclined surfaces 70*b*, 72*b*, wherein when the refill 10A and the like are loaded through the opening 130, the inclined surfaces 70*b*, 72*b* abut against the locking shaft 504 urged in the direction approaching the opening 130 and then climb over the locking shaft 504 while pushing the locking shaft 504 downward against the elastic member, wherein when the locking shaft 504 has moved back in the direction approaching the opening 130 by the elastic member after the inclined surfaces 70*b*, 72*b* have climbed thereover, the rear surface portions 70*a*, 72*a* are positioned to abut against the locking shaft 504.

[Third Protrusion Portion 58]

(Supplement 2-1)

The refill 10A and the like include:

a refill receiving portion 14 including:

a bottom wall 20 configured to allow a stack of connected staples to be placed thereon; and a first side wall 24 erected from the bottom wall 20;

a second side wall 26 erected from the bottom wall 20 and provided at a location opposing the first side wall 24; and a front wall 22 connecting the first side wall 24 with the second side wall 26 and having a discharging port 22*b* for discharging the connected staples S, wherein the front wall 22 is erected from the bottom wall 20 with the discharging port 22*b* interposed therebetween, wherein the refill receiving portion 14 is provided with an opening 15 at a location thereon opposing the bottom wall 20; and a cover member 450 configured to be fitted in the opening 15 to cover the connected staples S from above and also to descend along a stacking direction of the connected staples S inside the refill receiving portion 14 as the connected staples S are discharged through the discharging port 22*b* and thus the connected staples S are reduced.

wherein the cover member 50 has a protrusion portion (third protrusion portion) 58 protruding upward from an upper surface thereof, wherein the protrusion portion 58 has a top surface 58*a* configured to be positioned above upper edges of the first and second side walls 24, 26 when the maximum number of the connected staples S is stacked in the staple receiving portion 14.

(Supplement 2-2)

In the refill 10A and the like as set forth in the above Supplement 2-1, the protrusion portion 58 protrudes from a front part of the upper surface of the cover member 50 adjacent to the front wall 22.

(Supplement 2-3)

In the refill 10A and the like as set forth in the above Supplement 2-1 or 2-2, the front wall 22 has a third opening 22*a* positioned above the discharging port 22*b* and cut out along the stacking direction of the connected staples S from an upper edge (of the front wall 22), wherein when the cover member 50 has descended to the lowest position, the top surface 58*a* of the protrusion portion 58 is positioned at a location equal to or above a lower end edge of the third opening 22*a*.

(Supplement 2-4)

In the refill 10A and the like as set forth in the above Supplement 2-1 or 2-3, the refill 10I can be loaded to a cartridge 100A, wherein the protrusion portion 58 has engaging surfaces 580, 581, wherein when the refill 10I is loaded toto the cartridge 100A, the engaging surfaces 580, 581 can be pressed in the stacking direction by a pressing member 270 provided on the cartridge 100A and also can be engaged with the pressing member 270.

(Supplement 2-5)

In the refill 10I as set forth in the above Supplement 2-4, the protrusion portion 58 includes a front surface 58*c* adjacent to the front wall 22, a top surface 58*a* contiguous to the front surface 58*c*, and a rear surface 58*b* contiguous to the top surface 58*a* and positioned on a side thereof opposite to the front surface 58*c* with the top surface 58*a* interposed therebetween, wherein the engaging portions 580, 581 are provided on the rear surface 58*b*.

(Supplement 2-6)

In the refill 10I as set forth in the above Supplement 2-5, the engaging portions 580, 581 are a protrusion protruding from the rear surface 58*b* and configured to be engaged with a holding portion 274 protruding from a lower surface of the pressing member 270.

[For Sixth Protrusion Portions 590, 591]

(Supplement 3-1)

The refill 10I includes:

a staple receiving portion 14 including:

a bottom wall 20 configured to allow a stack of connected staples to be placed thereon;

a first side wall 24 erected from the bottom wall 20;

a second side wall 26 erected from the bottom wall 20 and provided at a location opposing the first side wall 24; and a front wall 22 connecting the first side wall 24 with the second side wall 26 and having a discharging port 22*b* for discharging the connected staples S, wherein the front wall 22 is erected from the bottom wall 20 with the discharging port 22*b* interposed therebetween; and a rear wall 28 erected from the bottom wall 20, connecting the first side wall 24 with the second side wall 26, and provided at a location opposing the front wall 22, wherein the staple receiving portion 14 is provided with an opening 15 at a location thereon opposing the bottom wall 20; and a cover member 450 configured to be fitted in the opening 15 to cover the connected staples S from above and also to descend along a stacking direction of the connected staples S inside the staple receiving portion 14 as the connected staples S are discharged through the discharging port 22*b* and thus the connected staples S are reduced, wherein the cover member 50 has protrusion portions (sixth protrusion portions) 590, 591 protruding upward from an upper surface thereof, wherein the protrusion portions 590, 591 are arranged at locations on the upper surface 50*a*, which are closer to the rear wall 28 than the middle portion thereof in a discharging direction of the connected staples S, wherein the protrusion portions 590, 591 have a top portion configured to be positioned above upper edge portions of the first and second side walls 24, 26 when the maximum number of the connected staples S is stacked in the staple receiving portion 14.

An embodiment of the present invention provides the following.

A refill includes a peripheral wall defining a space capable of accommodating staples therein, wherein the peripheral wall includes: a bottom wall having a first side, a second side opposite to the first side, and a third side connecting end portions of the first side and the second side; a first side wall standing from the first side; a second side wall standing from the second side and opposing the first side wall; and a front wall positioned above the third side and connecting the first side wall and the second side wall, wherein a first opening is formed on the first side wall and the front wall to extend across a boundary between the first side wall and the front wall.

In the refill, the first opening may include a first front wall-side opening formed on the front wall side with respect to the boundary, and a first side wall-side opening formed on the first side wall side with respect to the boundary.

In the refill, a maximum value of a length of the first side wall-side opening in a direction along the first side of the bottom wall may be 0.7 mm or greater.

In the refill, a maximum value of a length of the first front wall-side opening in a direction along the third side of the bottom wall may be 0.3 mm or greater.

In the refill, a length of the first side wall-side opening in a direction along the boundary may be 0.7 mm or greater.

In the refill, a second opening may be formed on the second side wall and the front wall to extend across a boundary between the second side wall and the front wall.

In the refill, the second opening may include a second front wall-side opening formed on the front wall side with respect to the boundary between the second side wall and the front wall, and a second side wall-side opening formed on the second side wall side with respect to the boundary between the second side wall and the front wall.

In the refill, a maximum value of a length of the second side wall-side opening in a direction along the second side of the bottom wall may be 0.7 mm or greater.

In the refill, a maximum value of a length of the second front wall-side opening in a direction along the third side of the bottom wall may be 0.3 mm or greater.

In the refill, a length of the second side wall-side opening in a direction along the boundary between the second side wall and the front wall may be 0.7 mm or greater.

In the refill, the second opening may include a second front wall-side opening formed on the front wall side with respect to the boundary between the second side wall and the front wall, and a second side wall-side opening formed on the side wall side with respect to the boundary between the second side wall and the front wall.

In the refill, a length from the first front wall-side opening to the second front wall-side opening may be set to be smaller than a length of the staples accommodated in the space in a direction along the third side of the bottom wall.

In the refill, the front wall may include a third opening between the first front wall-side opening and the second front wall-side opening.

In the refill, the refill may be capable of being inserted into a recess portion of a cartridge, the recess portion is defined by an end wall, a third side wall standing from one side of the end wall, and a fourth side wall standing from another side of the end wall opposite to the one side and opposing the third side wall, and a protrusion portion may be formed on a boundary between the end wall and the third side wall, and when the refill is inserted into the recess portion, the first opening may be fitted to the protrusion.

In the refill, the refill may be capable of being inserted into a recess portion of a cartridge, the recess portion is defined by an end wall, a third side wall standing from one side of the end wall, and a fourth side wall standing from another side of the end wall opposite to the one side and opposing the third side wall, a first protrusion may be formed on a third boundary between the end wall and the third side wall, and a second protrusion may be formed on a fourth boundary between the end wall and the fourth side wall, and when the refill is inserted into the recess portion, the first opening may be fitted to the first protrusion and the second opening may be fitted to the second protrusion.

The invention claimed is:

1. A refill mountable on a stapler main body in a state where the refill is loaded in a cartridge, the refill including:
- a staple receiving portion including:
  - a bottom wall configured to allow a stack of connected staples to be placed thereon;
  - a rear wall extending upward from a rear part of the bottom wall; and
  - a front wall in which a discharging port is formed for discharging the connected staples placed on the bottom wall, the front wall extending from the bottom wall via the discharging port, the front wall being opposite to the rear wall,
- wherein the bottom wall has a first protrusion portion and a second protrusion portion protruding downward from a lower surface at a rear end of the bottom wall adjacent to the rear wall and opposite to the discharging port,
- wherein the first protrusion portion and the second protrusion portion each have a rear surface portion that is adjacent to the rear wall and is located on an opposite side of the discharging port, the rear surface portion configuring an inclined surface that is continuous with a rear surface of the rear wall and extending downward, and
- wherein the first and second protrusion portions are spaced from each other in a direction transverse to a direction extending from the rear part of the bottom wall toward a front part of the bottom wall.

2. The refill according to claim 1,
- wherein the staple receiving portion includes a first side wall and a second side wall,
- wherein the bottom wall has a first side, a second side opposite to the first side, a third side connecting end portions of the first side and the second side, and a fourth side opposite to the third side,
- wherein the first side wall stands from the first side,
- wherein the second side wall stands from the second side and is opposite to the first side wall,
- wherein the front wall is positioned above the third side and connects the first side wall and the second side wall, and
- wherein the rear wall stands from the fourth side,
- wherein each of the first protrusion portion and the second protrusion portion is a plate-shaped member,
- wherein a plane of the first protrusion portion is flush with the first side wall such that it extends along the first side,
- wherein a plane of the second protrusion portion is flush with the second side wall such that it extends along the second side, and
- wherein the first protrusion portion and the second protrusion portion each have a triangular shape, which is continuous with the rear surface portion and the bottom wall and includes an inclined surface located on a side opposite to the rear surface portion.

3. A refill loadable in an opening of a cartridge that is loaded in a stapler main body, the opening having a rectangular shape with both sides of a bottom side of the opening being partially cut to have a pair of notches, the stapler main body being configured to receive the cartridge loaded therein and having a locking shaft, the locking shaft being positioned below the opening to extend along the bottom side of the opening and being movable in directions approaching and separating from the opening in a case where the refill is loaded through the opening, the refill including:

a staple receiving portion including:

a bottom wall configured to allow a stack of connected staples to be placed thereon;

a rear wall extending upward from a rear part of the bottom wall; and a front wall in which a discharging port is formed for discharging the connected staples placed on the bottom wall, the front wall extending from the bottom wall via the discharging port, the front wall standing from the bottom wall through the opening, the front wall being opposite to the rear wall, wherein the bottom wall has a first protrusion portion and a second protrusion portion protruding downward from a lower surface of a rear end of the bottom wall adjacent to the rear wall and opposite to the discharging port, wherein the first protrusion portion and the second protrusion portion each have a rear surface portion that is adjacent to the rear wall and is located on an opposite side of the discharging port, the rear surface portion configuring an inclined surface that is continuous with a rear surface of the rear wall and extending downward, the first and the second protrusion portions being spaced from each other in a direction transverse to a direction extending from the rear part of the bottom wall toward a front part of the bottom wall, wherein in a case where the refill is loaded through the opening, the first protrusion portion is fitted into one of the pair of notches of the both sides of the bottom side, and the second protrusion portion is fitted into the other one of the pair of notches, and wherein the rear surface portions of the first and the second protrusion portions are configured to abut against the locking shaft by the locking shaft being moved in a direction approaching the opening while the first and second protrusion portions are fitted into the pair of notches.

4. The refill as set forth in claim 3, wherein the locking shaft is urged in the direction approaching the opening by an elastic member, wherein the first and second protrusion portions include inclined surfaces which, when the refill is loaded through the opening, the inclined surfaces abut against the locking shaft to move the locking shaft in the direction separating from the opening, and the first and second protrusion portions pass over the locking shaft while pushing the locking shaft downward against the elastic member, and wherein when the locking shaft has moved back in the direction approaching the opening by the elastic member after the inclined surfaces have passed thereover, the rear surface portions of the first and second protrusion portions are positioned to abut against the locking shaft.

5. The refill according to claim 3, wherein the staple receiving portion includes a first side wall and a second side wall, wherein the bottom wall has a first side, a second side opposite to the first side, a third side connecting end portions of the first side and the second side, and a fourth side opposite to the third side, wherein the first side wall stands from the first side, wherein the second side wall stands from the second side and is opposite to the first side wall, wherein the front wall is positioned above the third side and connects the first side wall and the second side wall, and wherein the rear wall stands from the fourth side, wherein each of the first protrusion portion and the second protrusion portion is a plate-shaped member, wherein a plane of the first protrusion portion is flush with the first side wall such that it extends along the first side, wherein a plane of the second protrusion portion is flush with the second side wall such that it extends along the second side, and wherein the first protrusion portion and the second protrusion portion each have a triangular shape, which is continuous with the rear surface portion and the bottom wall and includes an inclined surface located on a side opposite to the rear surface portion.

* * * * *